(12) United States Patent
Hu et al.

(10) Patent No.: US 10,021,426 B2
(45) Date of Patent: Jul. 10, 2018

(54) MULTI-LAYER INTEGRATED UNEQUAL ERROR PROTECTION WITH OPTIMAL PARAMETER DETERMINATION FOR VIDEO QUALITY GRANULARITY-ORIENTED TRANSMISSIONS

(71) Applicants: Board of Trustees of The University of Alabama, Tuscaloosa, AL (US); San Diego State University (SDSU) Foundation, San Diego, CA (US)

(72) Inventors: Fei Hu, Tuscaloosa, AL (US); Yeqing Wu, Tuscaloosa, AL (US); Sunil Kumar, San Diego, CA (US)

(73) Assignees: Board of Trustees of The University of Alabama, Tuscaloosa, AL (US); San Diego State University (SDSU) Foundation, San Diego, CA (US)

( * ) Notice: Subject to any disclaimer, the term of this patent is extended or adjusted under 35 U.S.C. 154(b) by 469 days.

(21) Appl. No.: 14/491,092

(22) Filed: Sep. 19, 2014

(65) Prior Publication Data
US 2015/0078460 A1  Mar. 19, 2015

Related U.S. Application Data

(60) Provisional application No. 61/879,917, filed on Sep. 19, 2013.

(51) Int. Cl.
*G06F 11/08*  (2006.01)
*H04L 1/00*   (2006.01)
(Continued)

(52) U.S. Cl.
CPC .................................. *H04N 19/67* (2014.11)

(58) Field of Classification Search
CPC ............. H04L 1/007; H04L 2001/0098; H04L 1/0014; H04L 1/0015; H04N 19/67; H03M 13/1515; H03M 13/356; H03M 13/3761
See application file for complete search history.

(56) References Cited

U.S. PATENT DOCUMENTS

| | | | |
|---|---|---|---|
| 2002/0040460 A1* | 4/2002 | Choi ..................... | H04L 1/0041 714/755 |
| 2005/0275573 A1* | 12/2005 | Raveendran ...... | H03M 13/2927 341/120 |

(Continued)

FOREIGN PATENT DOCUMENTS

WO     2009/087546      7/2009

OTHER PUBLICATIONS

Hagenauer, "Rate Compatible Punctured Convolutional Codes and their applications," IEEE Transactions on Communications, vol. 36, pp. 389-400, Apr. 1988.*

(Continued)

*Primary Examiner* — Tsion B Owens
*Assistant Examiner* — Alison Slater
(74) *Attorney, Agent, or Firm* — Meunier Carlin & Curfman LLC

(57) ABSTRACT

A cross-layer encoder for providing UEP encoding of video data configured to provide UEP encoding of video data at an application layer of a transmission channel by receiving video packets having first and second priority levels, applying first and second coding schemes to video packets having first and second priority levels, respectively, and transmitting video frames having first and second priority levels. The cross-layer encoder can be configured to provide UEP encoding of video data at a physical layer of the transmission channel by receiving encoded video frames having first and second priority levels, applying third and fourth coding (Continued)

schemes to video frames having first and second priority levels, respectively, and transmitting cross-layer encoded video frames having first and second priority levels. The first through fourth coding schemes can generate different percentages of the total coding overhead based on first and second priority levels, respectively.

26 Claims, 12 Drawing Sheets

(51) Int. Cl.
    *H04N 19/65*     (2014.01)
    *H04N 7/26*     (2006.01)
    *H04N 19/67*     (2014.01)

(56) References Cited

U.S. PATENT DOCUMENTS

| | | | | |
|---|---|---|---|---|
| 2007/0298811 A1* | 12/2007 | Hartman | .............. | H04W 24/02 455/452.2 |
| 2010/0100791 A1* | 4/2010 | Abu-Surra | ........... | H03M 13/118 714/752 |
| 2011/0010607 A1* | 1/2011 | Raveendran | .......... | H04L 1/0067 714/776 |
| 2012/0210190 A1* | 8/2012 | Luby | ................ | H03M 13/3761 714/755 |
| 2014/0036999 A1* | 2/2014 | Ryu | ....................... | H04N 19/50 375/240.12 |
| 2014/0376645 A1* | 12/2014 | Kumar | ................... | H04N 19/89 375/240.27 |

OTHER PUBLICATIONS

Buckallew, C., et al., "Augmented Cognition for Intelligent Rehabilitation," Chapter 20, Cyber-Physical Systems: Integrated Computing and Engineering Design, 2013, pp. 309-334.

Hu, F., "Functional Near-Infrared (fNIR) Spectroscopy for Auto-Rehabilitation Cyber-Physical Systems: Towards Intelligent Signal Processing for Training Progress Indication," Cyber-Physical Systems: Integrated Computing and Engineering Design, 2013, pp. 351-363.

Paluri, S., et al., "Predicting Slice Loss Distortion in H.264/AVC Video for Low Complexity Data Prioritization," Image Processing (ICIP 2012), Orlando, Florida, 2012, pp. 689-692.

Talari, A., et al., "Optimized cross-layer forward error correction coding for H.264 AVC video transmission over wireless channels," in EURSIP Journal on Wireless Communications and Networking, vol. 206, 2013, 13 pages.

Wu, Y., et al., "Cross-layer Forward Error Correction Scheme using Raptor and RCPC Codes for Prioritized Video Transmission over Wireless Channels," IEEE Transactions on Circuits and Systems for Video Technology, 2014, pp. 1047-1060.

\* cited by examiner (a) Foreman (b) Bus (c) Coastguard (d) Akiyo

MULTI-LAYER INTEGRATED UNEQUAL ERROR PROTECTION WITH OPTIMAL PARAMETER DETERMINATION FOR VIDEO QUALITY GRANULARITY-ORIENTED TRANSMISSIONS

CROSS-REFERENCE TO RELATED APPLICATION

The present application claims priority to U.S. Provisional Patent Application No. 61/879,917, filed Sep. 19, 2013, entitled "MULTI-LAYER INTEGRATED UNEQUAL ERROR PROTECTION WITH OPTIMAL PARAMETER DETERMINATION FOR VIDEO QUALITY GRANULARITY-ORIENTED TRANSMISSIONS," which is incorporated herein by reference in its entirety.

STATEMENT REGARDING FEDERALLY FUNDED RESEARCH

This invention was made with Government support under Grant Nos. FA8750-13-1-046 and FA8750-11-1-0244 awarded by the Air Force Research Laboratory. The Government has certain rights in the invention.

BACKGROUND

Multimedia applications such as video streaming are delay sensitive and bandwidth intensive. Since wireless networks have limited bandwidth, the video is compressed using techniques such as MPEG-4 or H.264/AVC, which introduce the spatial and temporal dependencies within and across the video frames. As a result, the compressed video is very sensitive to the wireless channel induced packet losses as the losses introduce error propagation in the current as well as subsequent video frames leading to video quality degradation. Recent research has demonstrated the promise of cross-layer protocols for supporting the QoS demands of multimedia applications over wireless networks.

Video data can be protected against the channel errors by using forward-error-correction (FEC) schemes, which improve the successful data transmission probability and eliminate the costly retransmissions. Recently, cross-layer FEC schemes have been proposed where FEC codes are applied both at the application layer (AL) and physical layer (PHY). According to these recent proposals, equal-error-protection (EEP) or unequal-error-protection (UEP) FEC codes are applied at AL and EEP codes are applied at PHY. However, the maximum throughput does not always guarantee the minimum video distortion at the receiver. Video slices of a H.264/AVC video stream can be classified into priority classes based on the distortion contributed by their loss to received video quality. Unlike data packets, loss of H.264/AVC compressed video slices induces different amounts of distortion in the received video. Additionally, a video stream can tolerate loss of some low-priority slices because the lost slices can be error concealed and introduce low distortion in the received video, resulting in graceful quality degradation.

SUMMARY

Described herein are devices, systems and methods for providing cross-layer UEP FEC encoding of video data. Optionally, UEP FEC codes can be applied at the AL of a transmission channel and UEP FEC codes can be applied at the PHY of the transmission channel. Also described herein are devices, systems and methods for providing UEP FEC encoding of video data at the AL of the transmission channel using systematic Raptor codes. For example, systematic Raptor codes with a probability selection model can optionally be used to provide UEP for prioritized video data at the AL. It should be understood that Raptor codes are generally used to provide EEP at the AL. Additionally, rate-compatible punctured convolutional (RCPC) codes can optionally be used to provide UEP for prioritized video data at the PHY. Since both FEC codes (e.g., Raptor codes applied at the AL and RCPC codes applied at the PHY) share a common channel bandwidth to which to add their respective redundancies, the optimal ratio of overhead added by each FEC code can optionally be determined for a given channel signal-to-noise (SNR) and bandwidth (or data rate, bit rate, etc.). In other words, a cross-layer optimization to find the optimal parameters of both FEC codes can be performed by considering the relative priorities of video packets, which can minimize the video distortion and maximize the video peak SNR (PSNR) at the given channel SNR and bandwidth. A genetic algorithm (GA) based optimization of the cross-layer FEC scheme can optionally be used to maximize video quality at the receiver. It should be understood that the channel SNR can be obtained from the receiver in the form of channel side information, for example. As described in detail below, the proposed cross-layer UEP FEC schemes provide higher transmission reliability to the high priority video slices at the expense of higher loss rates for low priority slices.

An example cross-layer encoder for providing unequal error protection (UEP) encoding of video data can include at least one processing unit and a memory operably coupled to the processing unit. The cross-layer encoder can be configured to provide UEP encoding of the video data at an application layer of a transmission channel by receiving one or more video packets having a first priority level and one or more video packets having a second priority level, applying a first coding scheme to the video packets having the first priority level and a second coding scheme to the video packets having the second priority level, and transmitting encoded video frames having the first priority level and encoded video frames having the second priority level. The first and second coding schemes can generate different percentages of a total coding overhead based on the first and second priority levels, respectively. The cross-layer encoder can be further configured to provide UEP encoding of the video data at a physical layer of the transmission channel by receiving one or more of the encoded video frames having the first priority level and one or more of the encoded video frames having the second priority level, applying a third coding scheme to the encoded video frames having the first priority level and a fourth coding scheme to the encoded video frames having the second priority level, and transmitting the cross-layer encoded video frames having the first priority level and the cross-layer encoded video frames having the second priority level. The third and fourth coding schemes can generate different percentages of the total coding overhead based on the first and second priority levels, respectively.

Optionally, a greater percentage of the total coding overhead can be generated by the first or second coding scheme applied to the video packets having a higher priority level. For example, the greater percentage of the total coding overhead can be selected such that a recovery rate of the video packets having the higher priority level exceeds a predefined threshold. Alternatively or additionally, the different percentages of the total coding overhead generated by the first and second coding schemes, respectively, can optionally be determined using a probability selection model.

Optionally, the cross-layer encoder can be further configured to adaptively adjust the different percentages of the total coding overhead generated by the first and second coding schemes, respectively, based on a video packet error rate.

Optionally, each of the first and second coding schemes can be a systematic Raptor code. This disclosure contemplates using other rateless FEC codes at AL including, but not limited to, LT codes, non-systematic Raptor codes and Spinal codes, for example.

Alternatively or additionally, each of the third and fourth coding schemes can optionally be a RCPC code. This disclosure contemplates using other FEC codes at PHY including, but not limited to, Turbo codes, LDPC codes, Reed-solomon codes, for example. In addition, a lower RCPC code rate can optionally be assigned to the third or fourth coding scheme applied to encoded video frames having a higher priority level. Alternatively or additionally, an RCPC code rate respectively assigned to each of the third and fourth coding schemes applied to the encoded video frames having the first and second priority levels, respectively, can optionally be selected from RCPC codes $$\left\{\frac{8}{8}, \frac{8}{9}, \frac{8}{10}, \frac{8}{12}, \frac{8}{14}, \frac{8}{16}, \frac{8}{18}, \frac{8}{20}, \frac{8}{22}, \frac{8}{24}\right\}.$$

Optionally, a priority level assigned to each of the video packets can be based on a distortion contribution to received video quality of each of the video packets. For example, the distortion contribution to received video quality of each of the video packets can be computed as a cumulative mean square error.

Optionally, the cross-layer encoder can be further configured to determine optimal parameters for each of the first, second, third and fourth coding schemes based on one or more characteristics of the transmission channel. For example, the characteristics of the transmission channel can include at least one of a signal-to-noise ratio or a bandwidth of the transmission channel. Additionally, the optimal parameters for the first, second, third and fourth coding schemes can optionally be determined using a genetic algorithm. Optionally, other optimization algorithms for solving the maximum or minimum value can be used by the cross-layer encoder, such as Interior point method or Subgradient method.

Optionally, each of the first and second coding schemes can be a systematic Raptor code, and the optimal parameters can include values for a probability selection model used to determine the different percentages of the total coding overhead generated by the first and second coding schemes, respectively. Alternatively or additionally, each of the third and fourth coding schemes can optionally be an RCPC code, and the optimal parameters can include RCPC code rates selected to determine the different percentages of the total coding overhead generated by the third and fourth coding schemes, respectively.

An example encoder for encoding video data at an application layer of a node can include at least one processing unit and a memory operably coupled to the processing unit. The encoder can be configured to receive one or more video packets having a first priority level and one or more video packets having a second priority level, apply a first coding scheme to the video packets having the first priority level and a second coding scheme to the video packets having the second priority level, and pass the encoded video packets having the first priority level and encoded video frames having the second priority level to the lower layer. The first and second coding schemes can generate different percentages of a total coding overhead based on the first and second priority levels, respectively.

Optionally, a greater percentage of the total coding overhead can be generated by the first or second coding scheme applied to the video packets having a higher priority level. For example, the greater percentage of the total coding overhead can be selected such that a recovery rate of the video packets having the higher priority level exceeds a predefined threshold. Alternatively or additionally, the different percentages of the total coding overhead generated by the first and second coding schemes, respectively, can optionally be determined using a probability selection model.

Optionally, the encoder can be further configured to adaptively adjust the different percentages of the total coding overhead generated by the first and second coding schemes, respectively, based on a video packet error rate.

Optionally, a priority level assigned to each of the video packets can be based on a distortion contribution to received video quality of each of the video packets. For example, the distortion contribution to received video quality of each of the video packets can be computed as a cumulative mean square error.

Optionally, each of the first and second coding schemes can be a systematic Raptor code.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1A:
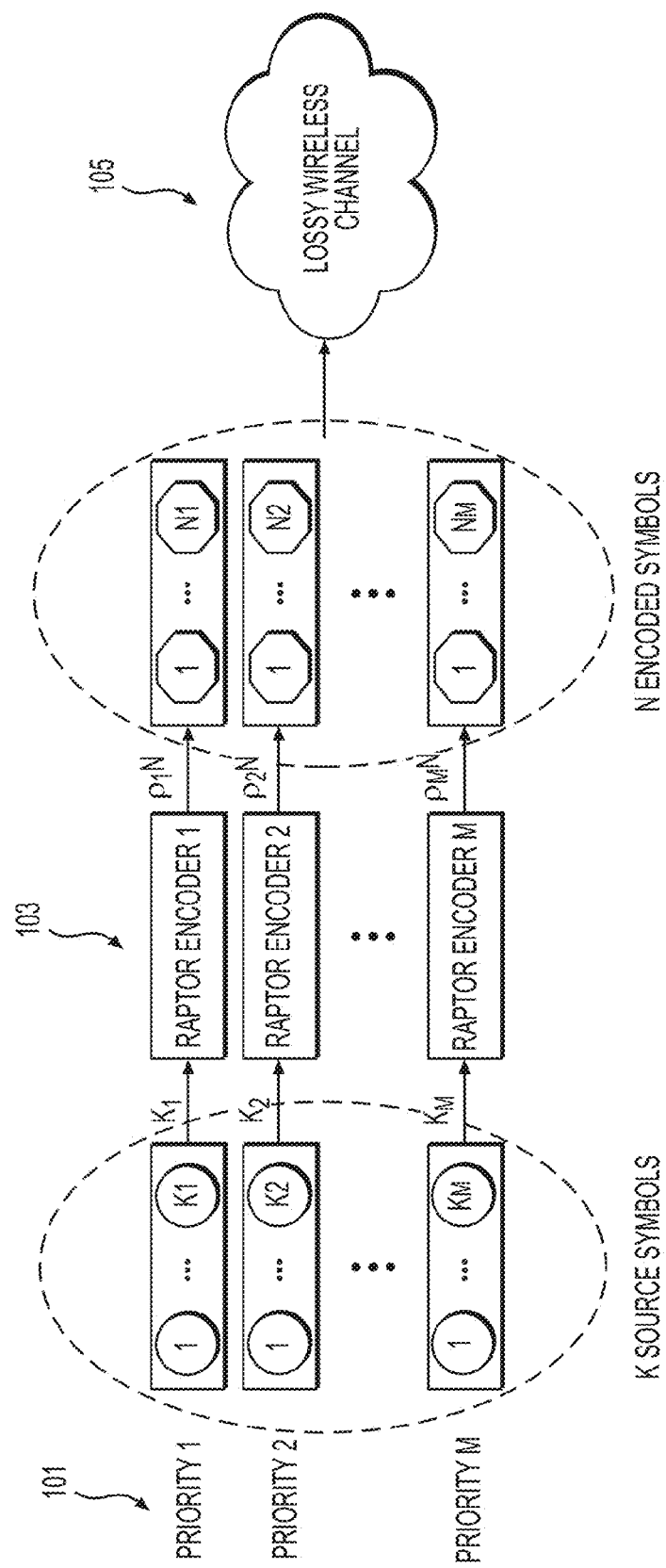
FIG. 1(a) is a block diagram illustrating an example Raptor encoder according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for providing cross-layer UEP encoding of video data at an application layer and a physical layer of a transmission channel, it will become evident to those skilled in the art that the implementations are not limited thereto. This disclosure contemplates that the implementations described here can be used in applications including, but not limited to, high-quality video delivery applications, teleconferencing applications, prioritized medical image delivery applications, remote video monitoring applications, data delivery over 3G/4G/WiFi and broadcast over wireless networks or cognitive radio networks.

A priority assignment scheme for H.264/AVC video slices, design of UEP Raptor codes and RCPC codes and cross-layer FEC schemes are described below. In the examples, a unicast video transmission from a transmitting node to a destination node in a single hop wireless network is assumed. Additionally, intermediate network layers, e.g., the transport layer (TL), network layer (NL), and link layer (LL) are ignored. This allows the techniques described herein to be generally applicable with different network protocol stacks.

Priority Assignment for H.264 Video Slices

In H.264/AVC, the video frames are grouped into group of pictures (GOPs), and each GOP is encoded as a unit. A fixed slice size configuration is used in the examples, where macroblocks of a frame are aggregated to form a fixed slice size. Let Ns be the average number of slices in one second of the video.

H.264 slices can be prioritized based on their distortion contribution to the received video quality. The loss of a slice in a reference frame can introduce error propagation in the current and subsequent frames until the end of the GOP. The total distortion introduced by the loss of a slice can be computed by using the cumulative mean squared error (CMSE), which takes into consideration the error propagation within the entire GOP. Let the original uncompressed video frame at time t be f(t), and the decoded frame without and with the slice loss be $\widehat{f(t)}$ and $\widetilde{f(t)}$, respectively. Assuming that each slice consists of M macroblocks consisting of 16×16 pixels, the MSE introduced by the loss of a slice is given by Eqn. (1) below.

$$\frac{1}{256M}\sum_{m=1}^{M}\sum_{i=1}^{16}\sum_{j=1}^{16}\left[(\text{pixel\_value}_{m,i,j})_{\widehat{f(t)}} - (\text{pixel\_value}_{m,i,j})_{\widetilde{f(t)}}\right]^2 \quad (1)$$

Herein, (m, i, j) represents the pixel at coordinate (i, j) for the mth macroblock. The CMSE contributed by the loss of the slice is computed as the sum of MSE over the current and all the subsequent frames in the GOP. The computation of slice CMSE, however, introduces high computational overhead as it requires decoding of the entire GOP for every slice loss. This overhead can be avoided by predicting the slice CMSE using a low-complexity generalized linear model (GLM) scheme, for example, we can use the scheme described in Paluri et al., "Predicting slice loss distortion in H.264/AVC video for low complexity data prioritization," in *IEEE Int. Conf. Image Processing (ICIP* 2012), Orlando, Fla., September-October 2012, which is incorporated herein by reference in its entirety. This model reliably predicts the CMSE values of the slices of a video frame by using the encoding parameters of only the current frame.

All slices in a GOP can be distributed into four priority levels or classes of equal size based on their CMSE values, where Priority 1 (Priority 4) slices introduce the highest (lowest) distortion to the received video quality. It should be understood that four priority classes are provided only as an example and that more or less than four priority classes can optionally be used. Let CMSEi denote the average CMSE of all slices in a priority level i. In the example described here, let CMSE1>CMSE2>CMSE3>CMSE4. Since CMSEi may vary considerably for various videos depending on their spatial and temporal content, the normalized $$\overline{CMSEi}, CMSE_i = \frac{CMSEi}{\sum_{i=1}^{4} CMSEi},$$

can be used to represent the relative importance of slices in a priority class. In Table I below, $\overline{CMSE_i}$ values for nine H.264 test video sequences, which have widely different spatial and temporal contents, are provided. This table is similar to Ali et al., "*Optimized Cross-layer Forward Error Correction Coding for H.264 AVC Video Transmission over*

*Wireless Channels*," in EURASIP J. Wireless Communication and Networking, 2013, which is incorporated herein by reference in its entirety.

In Table I, the first eight video sequences, which have very different characteristics (such as slow, moderate or high motion, for example), have almost similar $\overline{CMSE_i}$ values. Similar $\overline{CMSE_i}$ values are observed for some of the video sequences, such as Table Tennis and Mother Daughter. However, Akiyo, which is an almost static video sequence with very little motion or scene changes, has different $\overline{CMSEi}$ values than other video sequences. $\overline{CMSEi}$ values changed only slightly when these videos were encoded at different bit rates (e.g., 512 Kbps and 1 Mbps) and slices sizes (e.g., 150 bytes to 900 bytes). When these video sequences are encoded at 840 Kbps with 150 byte slices, Ns≈700. $\overline{CMSEi}$ values of the Bus video sequence in Table I, which are similar to most other video sequences of Table I, are used to tune the cross-layer FEC schemes in the examples described in detail below. Additionally, since $\overline{CMSEi}$ values of the Akiyo video sequence in Table I are different that the other video sequences, the performance of the cross-layer FEC schemes for the Akiyo video sequence is studied by using its $\overline{CMSEi}$ values and comparing its performance with the performance of the cross-layer schemes designed using $\overline{CMSEi}$ values of the Bus video sequence.

Normalized CMSE, $\overline{CMSEi}$, for Slices in Different Priorities of Sample Videos

TABLE I

| Sequence | $\overline{CMSE1}$ | $\overline{CMSE2}$ | $\overline{CMSE3}$ | $\overline{CMSE4}$ |
|---|---|---|---|---|
| Coastguard | 0.61 | 0.22 | 0.12 | 0.05 |
| Foreman | 0.63 | 0.21 | 0.11 | 0.05 |
| Bus | 0.64 | 0.21 | 0.10 | 0.04 |
| Football | 0.65 | 0.21 | 0.10 | 0.04 |
| Silent | 0.68 | 0.20 | 0.09 | 0.03 |
| Woods | 0.62 | 0.21 | 0.12 | 0.05 |
| Whale Show | 0.69 | 0.17 | 0.10 | 0.04 |
| Stefan | 0.61 | 0.24 | 0.12 | 0.03 |
| Akiyo | 0.85 | 0.12 | 0.03 | 0.01 |

Design of UEP Raptor Codes at the AL

Raptor codes consist of a pre-code (e.g., a low density parity check (LDPC) code) as the outer code and a weakened Luby Transform (LT) code as the inner code. Raptor codes can be parameterized by (K; C; Ω(x)), where K is the number of source symbols, C is a pre-code with block-length L and dimension K, and Ω(x) is a degree distribution of LT codes. Each encoded symbol is associated with an ID (ESI). The pre-code and weakened LT code can ensure a high decoding probability with a small coding overhead.

A Systematic Raptor codes can be used at the AL of a transmission channel or medium. This disclosure contemplates the transmission medium is any suitable transmission medium. For example, a transmission medium may be implemented by any medium that facilitates data exchange between a transmitter and receiver including, but not limited to, wired, wireless and optical links. As used herein, the transmission medium includes a wireless channel. If there are K source symbols S[i] in one block, i=0, . . . , K−1, the first K encoded symbols are constructed such that E[0]=S[0], E[1]=S[1], E[K−1]=S[K−1]. The systematic Raptor codes can correctly decode some source symbols even if the number of received encoded symbols, Nr, is less than the number of source symbols, K.

The decoding failure probability of Raptor codes (e.g., the probability of at least one source symbol not being recovered) can be estimated as a function of K and Nr as shown by Eqn. (2) below.

$$P_e(\varepsilon_r) = \begin{cases} 1 & \text{if } \varepsilon_r < 0 \\ 0.85 \times 0.567^{\varepsilon_r} & \text{if } \varepsilon_r \geq 0 \end{cases} \quad (2)$$

where $\varepsilon_r$=Nr−K is the received encoding overhead of Raptor codes.

The average received overhead, $\overline{R}_{\varepsilon_r}$, required to recover the K source symbols can be calculated as shown by Eqn. (3) below.

$$\overline{R}_{\varepsilon_r} \approx \frac{2}{K} \quad (3)$$

The number of additional encoded symbols needed for successfully decoding all the K source symbols is η= $\overline{R}_{\varepsilon_r} \times K \approx 2$, which is independent of K. From Eqn. (3), it can be observed that the total coding overhead (as a percentage) needed for full symbol recovery decreases with the increase in K.

As described above, Raptor codes are generally used to provide EEP at the AL. With reference to FIG. 1(a), however, Raptor codes can be modified with a probability selection model to provide UEP for video data at the AL. In particular, FIG. 1(a) is a block diagram illustrating an example Raptor encoder. This disclosure contemplates that the Raptor encoder can optionally be implemented using at least one processor and a memory, for example, as described below. In FIG. 1(a), M priority levels 101, Raptor Encoders 103 and a lossy wireless channel 105 are shown. An independent Raptor Encoder 103 can be provided for each respective priority level 101. To implement UEP with Raptor codes, more (less) coding overhead for higher (lower) priority symbols can be generated in order to provide higher (lower) level of protection to higher (lower) priority symbols. For example, assuming Priority level 1 is higher than Priority level 2, Raptor Encoder 1 (e.g., a first coding scheme) can be configured to generate a greater percentage of the total coding overhead as compared to Raptor Encoder 2 (e.g., a second coding scheme). A probability statistic model (e.g., with values $\rho_1, \rho_2, \ldots \rho_M$) can be used to determine the percentages of the total coding overhead generated by each of the independent Raptor Encoders 1-M.

Assume M priority levels are assigned to video slices as described above, e.g., where L1 is the highest priority, followed by L2, and so on. For Ki source symbols (e.g., video slices) with priority Li, $K=\sum_{i=1}^{M} K_i$. Let $$\rho_i = \frac{N}{Ni} \text{ for } i = 1,$$

. . . , M be the percentage of encoded symbols associated with data of priority level Li.

The lower bound of the symbol recovery rate, Psrr, assuming a uniform channel symbol loss rate (PER) is shown by Eqn. (4) below.

$$P_{srr}(\varepsilon_r) = P_e(\varepsilon_r) \times P_{r|F} + (1 - P_e(\varepsilon_r)) \times P_{r|S} \quad (4)$$
$$= 0.85 \times 0.567^{\varepsilon_r} \times (1 - PER) + (1 - 0.85 \times 0.567^{\varepsilon_r}) \times 1$$

where $P_{r|F}$ is the lower bound of symbol recovery rate when the complete decoding fails, and $P_{r|S}$ is the symbol recovery rate when the complete decoding succeeds. Optionally, an amount or percentage of the total coding overhead can be assigned to the highest priority video slices (e.g., one or more of the highest priority levels) first, such that their recovery rates are above a predefined threshold, $\zeta_{r1}$. Then, the remaining overhead can optionally be assigned to the lower priority video slices (e.g., one or more of the lower priority levels).

The minimum coding overhead, $\overline{R}\varepsilon_t(Ki)$ for complete recovery of Ki source symbols of priority Li with probability Psrr($\varepsilon_r$(Ki)) is shown by Eqn. (5) below.

$$\overline{R}_{\varepsilon_t}(K_i) = \frac{K_i \times PER + \varepsilon_r(K_i)}{(1 - PER) \times K_i}, i = 1, \ldots, M \quad (5)$$

where $\varepsilon_r(Ki)$ is the required number of additional received symbols for priority level i in order to completely recover the source symbols of this priority level. As used herein, a video frame or slice encoded by the Raptor code is an AL-frame.

Figure 1B:
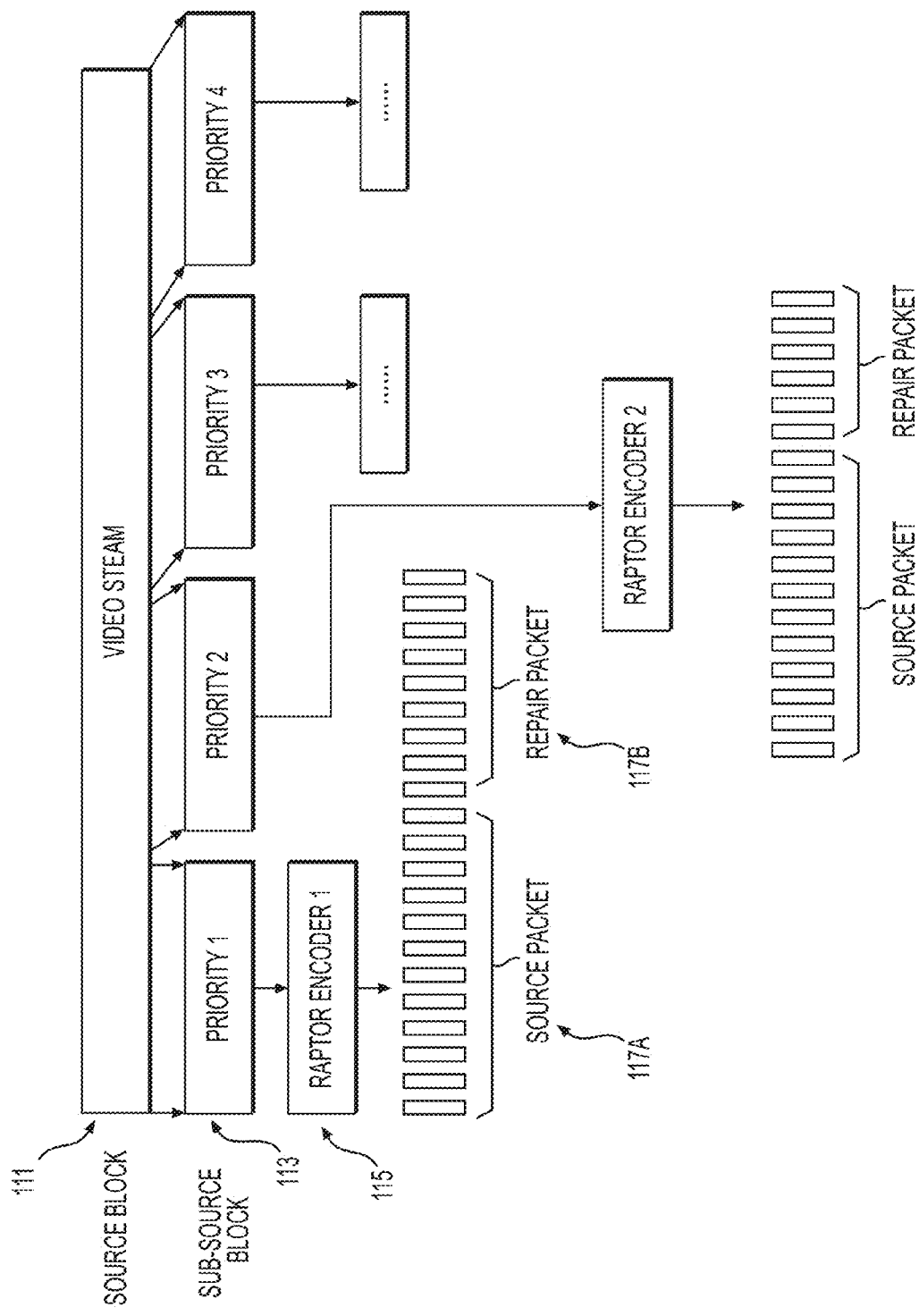
FIG. 1(b) is block diagram illustrating another example Raptor encoder according to implementations described herein.

Referring now to FIG. 1(b), a block diagram of another example Raptor encoder is shown. In FIG. 1(b), a video stream 111 includes video slices 113 (e.g., video packets) having different priority levels (e.g., Priority 1-Priority 4), which is described in detail above. For example, the video slices 113 can be assigned priority levels based on their respective distortion contributions to received video quality. For example, the distortion contribution to received video quality of each of the video slices can be computed as the CSME. In FIG. 1(b), the Raptor Encoders 115 are also shown. In FIG. 1(b), an independent Raptor encoder is provided for each priority level similar to FIG. 1(a). The Raptor Encoders are configured to apply Raptor codes as described in detail above. The encapsulated video packet includes a source packet 117A and a repair packet 117B.

Although systematic Raptor codes at AL are provided as an example, this disclosure contemplates using other rateless FEC codes at AL including, but not limited to, LT codes, non-systematic Raptor codes and Spinal codes, for example.

Design of RCPC Codes at the PHY

Additionally, RCPC codes can optionally be used at the PHY because of their flexibility in providing various code rates. RCPC codes use a low-rate convolutional mother code with various puncturing patterns to obtain codes with various rates. The RCPC decoder employs a Viterbi decoder, whose bit error rate (BER), Pb, is upper bounded as shown by Eqn. (6) below.

$$P_b \le \frac{1}{P} \sum_{d=d_f}^{\infty} c_d P_d \quad (6)$$

where $d_f$ is the free distance of the convolutional code, P is the puncturing period, and $c_d$ is the total number of error bits produced by the incorrect paths, which is also referred to as the distance spectrum. Finally, $P_d$ is the probability of selecting a wrong path in Viterbi decoding with Hamming distance d. It should be understood that $P_d$ depends on the modulation and channel characteristics. This is similar to Ali et al., "*Optimized Cross-layer Forward Error Correction Coding for H.264 AVC Video Transmission over Wireless Channels*," in EURASIP J. Wireless Communication and Networking, 2013, which is incorporated herein by reference in its entirety.

For an RCPC code with rate R, using the AWGN channel, binary phase shift keying (BPSK) modulation and the symbol to noise power ratio $$\frac{Es}{No} = R\frac{Eb}{No},$$

the value of $P_d$ (using soft Viterbi decoding) is shown by Eqn. (7) below.

$$P_d = \frac{1}{2}\text{erfc}\sqrt{d\frac{E_s}{N_0}} = Q\sqrt{2d\frac{E_s}{N_0}} \quad (7)$$

where $$Q(\lambda) = \frac{1}{\sqrt{2\pi}} \int_{\lambda}^{\infty} e^{-\frac{t^2}{2}} dt$$

For an RCPC code with rate R, using a Rayleigh flat fading channel with perfect channel estimation and soft decision encoding, BPSK modulation and the symbol to noise power ratio $$\frac{Es}{No} = R\frac{Eb}{No},$$

the value of $P_d$ (using soft Viterbi decoding) is shown by Eqn. (8) below.

$$P_d = q^d \sum_{k=0}^{d-1} \binom{d-1+k}{k}(1-q)^k \quad (8)$$

where $$q = \frac{1}{2}\left(1 - \sqrt{\frac{\gamma R}{(1+\gamma R)}}\right)$$

and $$\gamma = \frac{E_b}{N_0}.$$

Figure 1C:
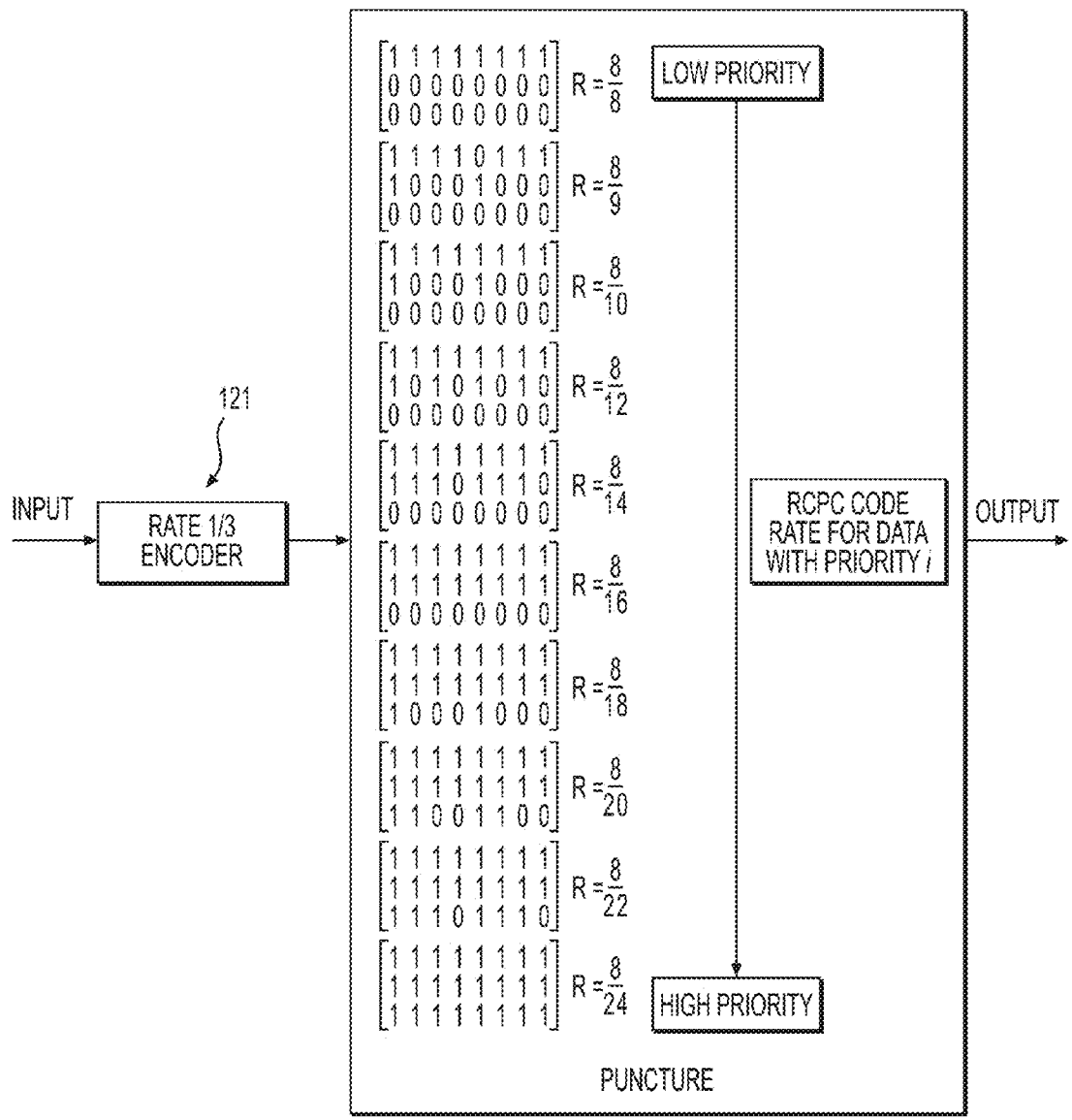
FIG. 1(c) is a block diagram illustrating an example RCPC encoder according to implementations described herein.

At the PHY, cyclic redundancy check (CRC) bits can be added to each AL-frame (e.g., each video frame encoded at the AL) to detect any RCPC decoding error. Next, each AL-frame is encoded using an RCPC code. An RCPC code designed with the mother code rate of $$R = \frac{1}{3}$$

and memory M=6 can be used. Based on the AL-frame priority level, the RCPC codes can be punctured to get appropriate higher rates. For example, for four priority levels of AL-frames, where R1≤R2≤R3≤R4 and Ri∈

$$\left\{\frac{8}{8}, \frac{8}{9}, \frac{8}{10}, \frac{8}{12}, \frac{8}{14}, \frac{8}{16}, \frac{8}{18}, \frac{8}{20}, \frac{8}{22}, \frac{8}{24}\right\},$$

where Ri represents the RCPC code rate of AL-frames with priority level i. FIG. 1(c) is a block diagram illustrating an example RCPC encoder, where the RCPC encoders 121 are configured to apply different RCPC code rates, Ri, based on AL-frames with priority level i. This disclosure contemplates that the RCPC encoders can optionally be implemented using at least one processor and a memory, for example, as described below. Therefore, the parameters that can be tuned at the PHY are the RCPC code rates, e.g., R1 through R4. As used herein, an AL-frame encoded by the RCPC code is a PHY-frame.

In the examples described herein, it is assumed that each transmitted packet contains one PHY-frame. Note that the number of PHY-frames in a packet does not affect the optimum cross-layer setup of FEC codes according to the techniques described herein. Additionally, conventional BPSK modulation and AWGN and Rayleigh flat fading channels are used in the examples described herein. However, this disclosure contemplates that the techniques can be extended to more complex channel models by using an appropriate $P_d$ as shown by Eqn. (8).

Although RCPC codes at PHY are provided as an example, this disclosure contemplates using other FEC codes at PHY including, but not limited to, Turbo codes, LDPC codes, Reed-solomon codes, for example.

System Model at Transmitter

Figure 2:
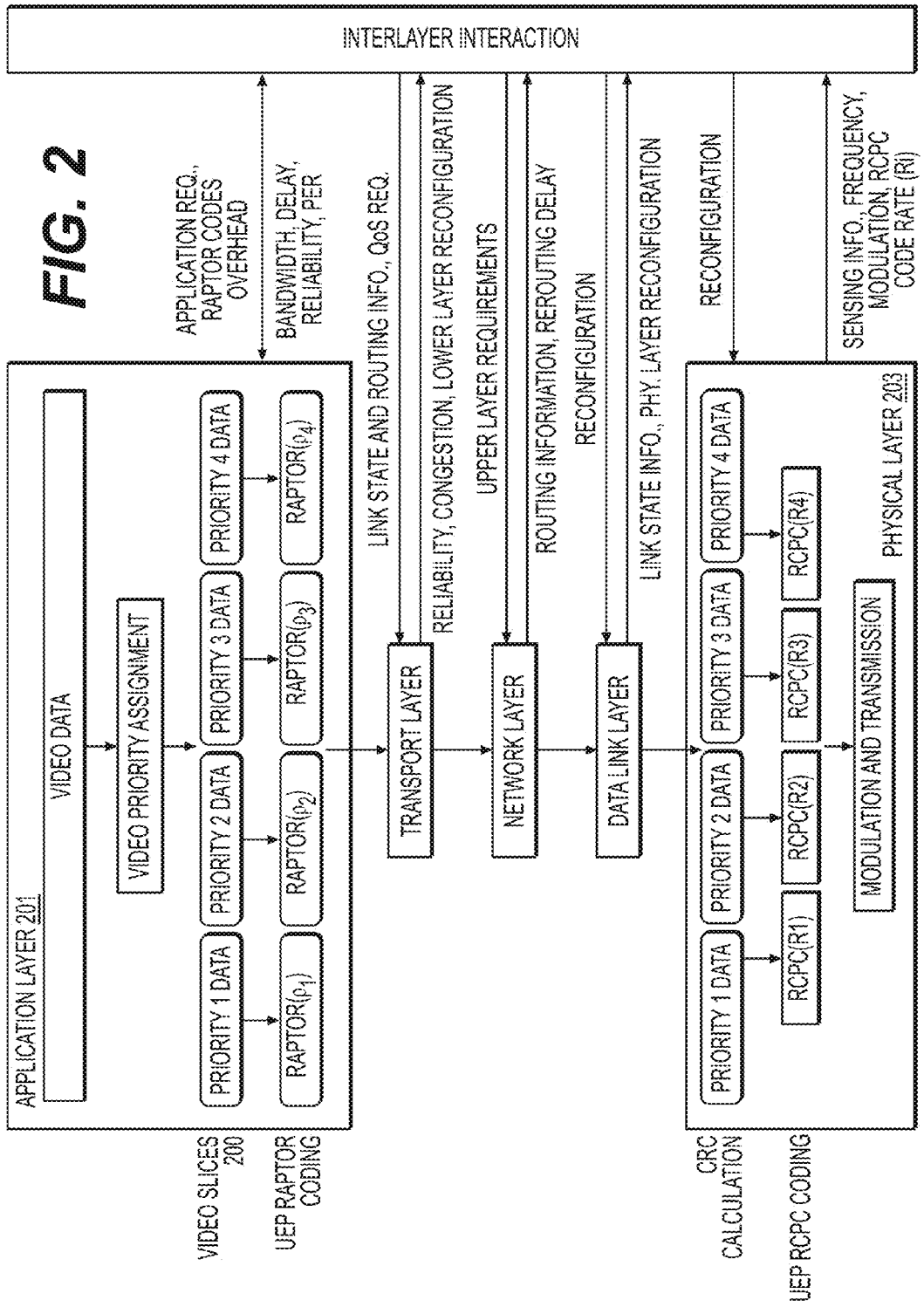
FIG. 2 is a block diagram illustrating example cross-layer FEC schemes according to implementations described herein.
Figure 3:
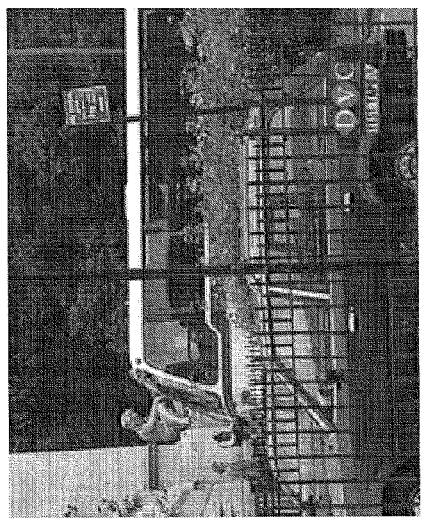
FIGS. 3(a)-3(d) are frames of example video sequences used in the examples described herein.
Figure 3:
Figure 3:
Figure 3:
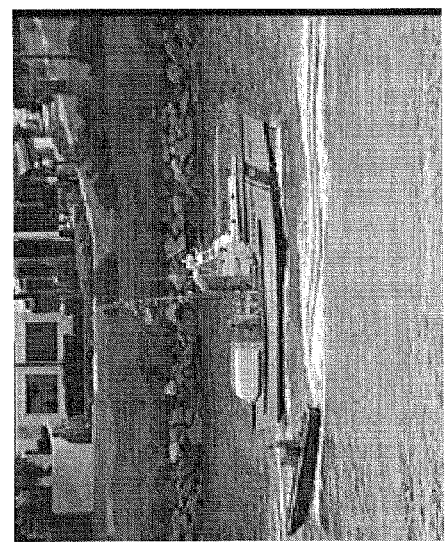

Referring now to FIG. 2, there is illustrated a block diagram illustrating example cross-layer UEP FEC scheme S-IV (i.e., UEP at the AL 201, UEP at the PHY 203) is shown. In FIG. 2, the video slices 200 (e.g., video packets) are prioritized into one or more priority levels (e.g., Priority 1-Priority 4) and encoded at the AL 201 and transmitted. The AL-frames are then encoded at the PHY 203 and then transmitted.

TABLE II

VARIOUS COMBINATIONS OF CROSS-LAYER FEC CODING SCHEMES

| Model | S-I | S-II | S-III | S-IV |
|---|---|---|---|---|
| AL FEC | No FEC | EEP | UEP | UEP |
| PHY FEC | UEP | UEP | EEP | UEP |

In S-I scheme, the FEC coding is applied only at PHY to protect the video slices based on their priority by using the UEP RCPC coding. This disclosure contemplates that the priority of each AL-frame is conveyed to PHY by using cross-layer communication in S-I through S-IV schemes. The S-II, S-III, and S-IV schemes represent the cross-layer FEC schemes where video data is protected at both AL and PHY. In S-II scheme, the regular systematic Raptor codes (e.g., EEP Raptor codes) and UEP RCPC codes are applied at AL and PHY, respectively. The S-III scheme applies UEP Raptor codes and EEE RCPC code at AL and PHY, respectively. In S-IV scheme, the UEP Raptor codes and UEP RCPC codes are applied at AL and PHY, respectively.

Decoding at Receiver

Let PERi denote the packet error rate of AL-frames of priority level i at the receiver after RCPC decoding and before Raptor decoding at AL. PERi can be computed by using the BER from Eqn. (6).

In S-I scheme, each AL-frame consists of an uncoded video slice as the Raptor coding is not applied at AL. Therefore, the video slice loss rate (VSLR) of source packets with priority level i is VSLRi=PERi. In S-II through S-IV schemes, the Raptor coding is also applied and the decoding error rate of Raptor codes should be considered in VSLRi. In S-III scheme, the EEP RCPC code is used at the PHY, hence PER1=PER2=PER3=PER4=PER. In S-II and S-IV schemes, PER1≤PER2≤PER3≤PER4 since the UEP RCPC codes are applied at the PHY. If the Raptor codes are used at the AL, Eqn. (4) can be applied to find the final Raptor decoding symbol recovery rates Psrr(i), i∈1, . . . , 4 for each priority level i at the receiver. If the symbol recovery rate of priority level i is Psrr(i), then VSLRi=1−Psrr(i).

Cross-Layer Optimization of FEC Codes

In the cross-layer FEC schemes described herein, the AL and PHY FEC codes share the same available channel bandwidth. As the channel SNR increases, the RCPC code rate at the PHY can be increased, and more channel bandwidth becomes available for Raptor coding at the AL. For low channel SNR, assigning a higher portion of the available redundancy to Raptor codes at the AL may not improve the delivered video quality since almost all PHY-frames would be corrupted during transmission. Therefore, a lower RCPC code rate should be used at PHY, which would consume a larger portion of the channel bandwidth allowing only a weaker Raptor code at the AL. Thus, cross-layer FEC code optimization to find the optimal parameters for the FEC schemes is described in detail below.

Formulation of Optimization Problem

The goal of cross-layer optimization is to deliver a video with the highest possible PSNR for a given channel characteristics such as channel bandwidth C and SNR, for example. It should be understood that channel bandwidth and SNR are provided only as examples and that other channel characteristics can be considered. Since computing the video PSNR requires decoding the video at the receiver, it is not feasible to use PSNR directly as the optimization metric due to its heavy computational complexity. Therefore, a low-complexity substitute function, F, to represent the behavior of video PSNR can be used. This function is similar to that in Ali et al., "*Optimized Cross-layer Forward Error Correction Coding for H.264 AVC Video Transmission over Wireless Channels*," in EURASIP J. Wireless Communication and Networking, 2013, which is incorporated herein by reference in its entirety.

The PSNR of a video stream depends on the percentage of lost slices and their CMSE values. However, the slice loss may not be linearly correlated to the decrease in PSNR. Therefore, a function "normalized F", F̄, to capture the behavior of PSNR based on the slice loss rates and their CMSE as shown in Eqn. (9) below can be used.

$$\bar{F} = \sum_{i=1}^{r} \overline{CMSE_i^\alpha} \cdot VSLR_i \quad (9)$$

Here r is the number of slice priorities and $\overline{CMSE_i}$ is the normalized CMSE values, which represent the relative priority (e.g., weight) of priority level i slices. The parameter α≥0 adjusts the weight assigned to slices of each priority level such that minimizing F results in maximizing the video PSNR. Selection of the optimal a is described in the work: Ali et al., "*Optimized Cross-layer Forward Error Correction Coding for H.264 AVC Video Transmission over Wireless Channels*," in EURASIP J. Wireless Communication and Networking, 2013.

To minimize F, the parameters of the FEC codes can be tuned at AL and PHY. Since the remaining three scheme (S-I, S-II, S-III) are a sub-set of the optimization function of scheme S-IV, only the optimization function of S-IV is discussed here. In S-IV, UEP FEC codes are used at both layers (e.g., UEP Raptor codes at AL and UEP RCPC codes at PHY), and optimization parameters are $\rho_1$ through $\rho_3$, $\vartheta_t$, and R1 through R4. The optimization function is shown by Eqn. (13) below.

$$\{\rho_1^*, \rho_2^*, \rho_3^*, \theta_t^*, R_1^*, R_2^*, R_3^*, R_4^*\} = \underset{\{\rho_1^*, \rho_2^*, \rho_3^*, \theta_t^*, R_1^*, R_2^*, R_3^*, R_4^*\}}{\operatorname{argmin}} \overline{F}, \quad (13)$$

$$\text{s.t.} \sum_{i=0}^{4} \rho_i \theta_t N_s (S+1) R_i^{-1} \leq C.$$

The optimization of Raptor code parameters involves employing Eqn. (4) for various priority levels, which cannot be represented by a linear function. Also, the concatenation of two FEC codes presents a nonlinear optimization problem. Optimization algorithms such as genetic algorithms (GA) can be used to solve nonlinear optimization problems. For example, the GA toolbox in MATLAB of MATH-WORKS, INC. of NATICK, Mass. was used to perform optimizations in the examples provided herein. It should be understood that GAs are provided as only one example of optimization algorithms and that other known optimization algorithms can be used. Optionally, other optimization algorithms which can be used to solve the maximum or minimum value can be used, such as Interior point method or Subgradient method.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 10:
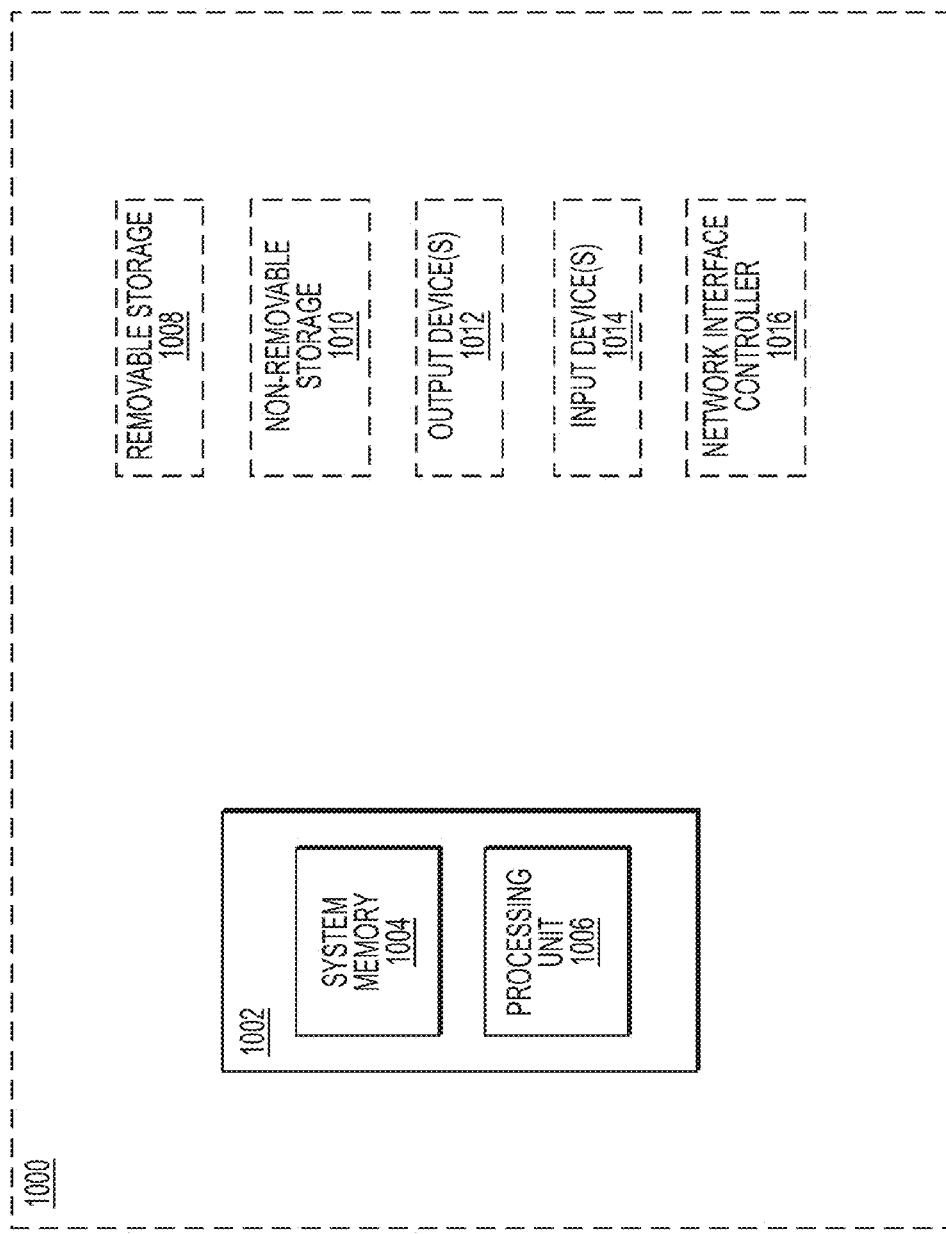
FIG. 10 is a block diagram illustrating an example computing device.

When the logical operations described herein are implemented in software, the process may execute on any type of computing architecture or platform. For example, referring to FIG. 10, an example computing device upon which embodiments of the invention may be implemented is illustrated. The computing device 1000 may include a bus or other communication mechanism for communicating information among various components of the computing device 1000. In its most basic configuration, computing device 1000 typically includes at least one processing unit 1006 and system memory 1004. Depending on the exact configuration and type of computing device, system memory 1004 may be volatile (such as random access memory (RAM)), non-volatile (such as read-only memory (ROM), flash memory, etc.), or some combination of the two. This most basic configuration is illustrated in FIG. 10 by dashed line 1002. The processing unit 1006 may be a standard programmable processor that performs arithmetic and logic operations necessary for operation of the computing device 1000.

Computing device 1000 may have additional features/functionality. For example, computing device 1000 may include additional storage such as removable storage 1008 and non-removable storage 1010 including, but not limited to, magnetic or optical disks or tapes. Computing device 1000 may also contain network connection(s) 1016 that allow the device to communicate with other devices. Computing device 1000 may also have input device(s) 1014 such as a keyboard, mouse, touch screen, etc. Output device(s) 1012 such as a display, speakers, printer, etc. may also be included. The additional devices may be connected to the bus in order to facilitate communication of data among the components of the computing device 1000. All these devices are well known in the art and need not be discussed at length here.

The processing unit 1006 may be configured to execute program code encoded in tangible, computer-readable media. Computer-readable media refers to any media that is capable of providing data that causes the computing device 1000 (i.e., a machine) to operate in a particular fashion. Various computer-readable media may be utilized to provide instructions to the processing unit 1006 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1006 may execute program code stored in the system memory 1004. For example, the bus may carry data to the system memory 1004, from which the processing unit 1006 receives and executes instructions. The data received by the system memory 1004 may optionally be stored on the removable storage 1008 or the non-removable storage 1010 before or after execution by the processing unit 1006.

Computing device 1000 typically includes a variety of computer-readable media. Computer-readable media can be any available media that can be accessed by device 1000 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Examples

The performance of optimized cross-layer FEC schemes for four CIF (352×288 pixels) test video sequences shown in FIGS. 3(a)-3(d), i.e., Foreman, Bus, Coastguard, and Akiyo, respectively, are described below. These sequences have different texture and motion contents. A frame of each of these test video sequences is shown in FIGS. 3(a)-3(d). These sequences were encoded using H.264/AVC JM 14.2 ISO/IEC Std. reference software, available at http://iphome.hhi.de/suehring/tml/download/, at 840 Kbps and 150 bytes slice size, for a GOP length of 30 frames with GOP structure I DR B P B . . . P B at 30 frames/sec. The slices were formed using dispersed mode FMO with two slice groups per frame. Two reference frames were used for predicting the P and B frames, with error concealment enabled using temporal concealment and spatial interpolation. Two channel transmission rates of C=1.4 Mbps and C=1.8 Mbps were used to study the performance over AWGN channels and a channel transmission rate of C=1.4 Mbps was used to study the performance over Rayleigh flat fading channels.

The video slices were prioritized into four priority levels as described in detail above. It should be understood, however, that more or less than four priority levels can optionally be used. Video slices of each priority level are encoded by independent Raptor encoders at the AL so that their priorities are maintained and can be used by the RCPC encoder at the PHY. For different channel SNRs, appropriate selection probabilities for Raptor codes are chosen to provide UEP based on the normalized slice CMSE values.

Discussion of Cross-Layer Optimization Results

Figure 4:
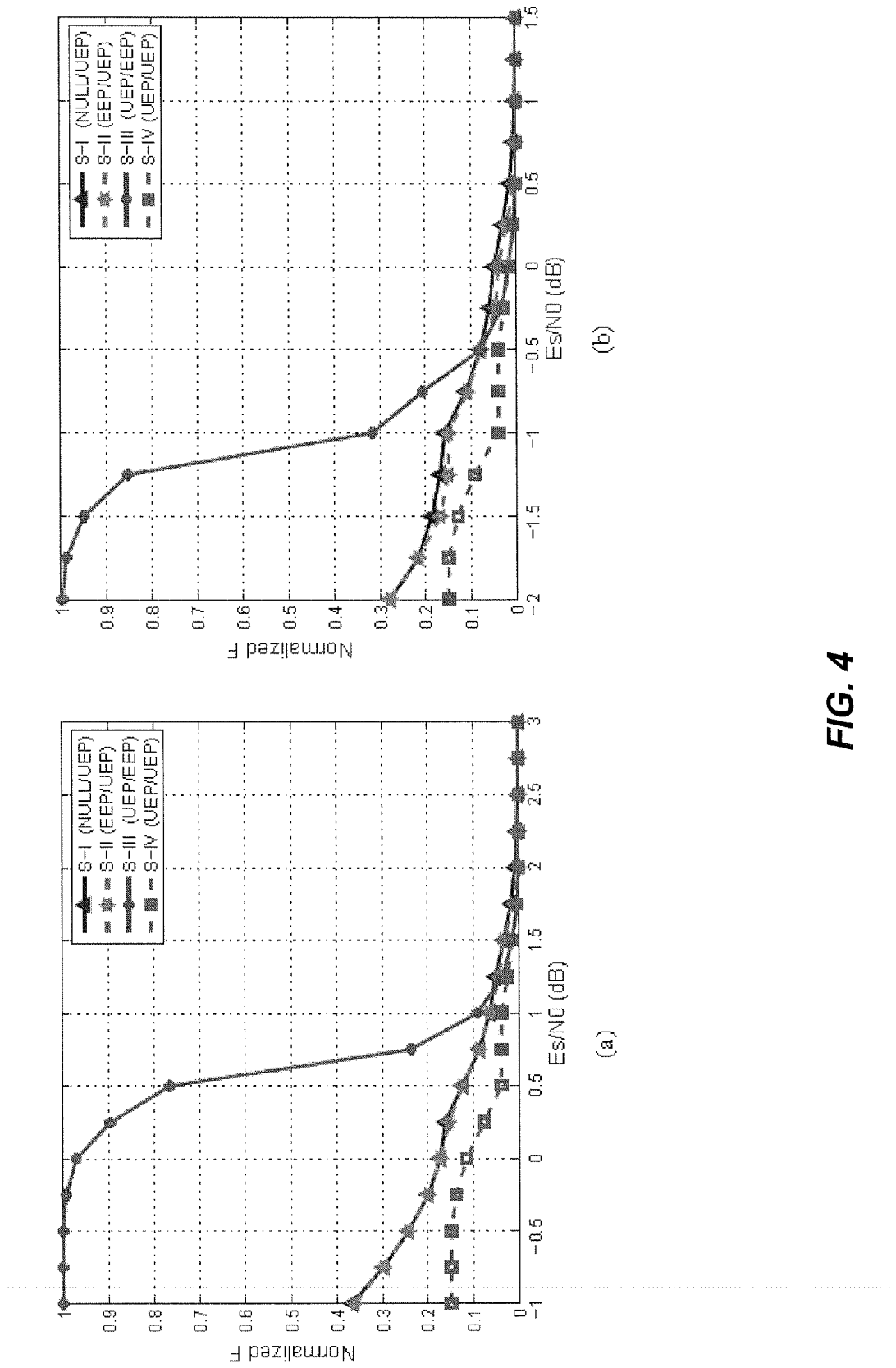
FIGS. 4(a)-4(b) are graphs illustrating the normalized optimization function (i.e., ¯) of the Bus video sequence (i.e., FIG. 3(b)) over an additive white Gaussian noise (AWGN) channel for channel bit rates C=1.4 Mbps and C=1.8 Mbps, respectively.

The cross-layer optimization results, including the FEC parameters (e.g., Ri for RCPC codes and $\vartheta_t$ and $\rho_1$ for Raptor codes), VSLRi, $\overline{F}$, and F are presented below. Here F is calculated by replacing the $\overline{CMSEi}$ values by the actual average CMSEi in Eqn. (9) for the H.264 encoded video sequence under consideration. The performance of the cross-layer FEC schemes over AWGN channels are described first. The experiments for the Rayleigh fading channel are then described below. One GOP of video data was used as a source block to be encoded by Raptor codes and the optimum FEC code rates were computed for slices of each GOP according to the average channel SNR. The results of all four FEC schemes for three test video sequences (e.g., Bus, Foreman and Coastguard), encoded at 840 Kbps, are reported in Tables IV through VII for channel bit rate C=1.4 Mbps. FIGS. 4(a) and 4(b) show the minimum normalized F achieved by the optimized cross-layer schemes for the two channel bit rates. The results for the Akiyo video sequence are described separately below. For a GOP length of 30 frames (e.g., corresponding to 1 second video duration at 30 frames/second), the optimization process takes about 50 ms in MATLAB, on an INTEL CORE 2 DUO, 2.2 GHz, 3 GB RAM processor of INTEL CORPORATION of SANTA CLARA, Calif. For one or two video frames (instead of a whole GOP), the optimization process takes about 7 ms and 18 ms, respectively.

TABLE IV

OPTIMUM CROSS-LAYER PARAMETERS FOR S-I SCHEME WITH C = 1.4 MBPS

| $\frac{E_s}{N_0}$ | −1 dB | −0.5 dB | 0 dB | 0.5 dB | 1 dB | 1.5 dB | 2 dB | 2.5 dB | 3 dB |
|---|---|---|---|---|---|---|---|---|---|
| $\overline{F}$ | 0.366 | 0.244 | 0.178 | 0.125 | 0.065 | 0.034 | 0.009 | 0.002 | 0 |
| $F_{Bus}$ | 162.3 | 108.3 | 77.4 | 55.4 | 29.5 | 14.6 | 3.9 | 0.7 | 0.1 |
| $F_{Coastguard}$ | 67.5 | 44.7 | 31.5 | 23.6 | 12.7 | 6.1 | 1.6 | 0.3 | 0 |
| $F_{Foreman}$ | 70.0 | 46.0 | 31.6 | 23.9 | 11.7 | 6.6 | 1.7 | 0.3 | 0 |
| $R_1$ | $\frac{8}{24}$ | $\frac{8}{20}$ | $\frac{8}{18}$ | $\frac{8}{16}$ | $\frac{8}{16}$ | $\frac{8}{14}$ | $\frac{8}{14}$ | $\frac{8}{14}$ | $\frac{8}{14}$ |

TABLE IV-continued

OPTIMUM CROSS-LAYER PARAMETERS FOR S-I SCHEME WITH C = 1.4 MBPS

| $\frac{E_s}{N_0}$ | −1 dB | −0.5 dB | 0 dB | 0.5 dB | 1 dB | 1.5 dB | 2 dB | 2.5 dB | 3 dB |
|---|---|---|---|---|---|---|---|---|---|
| $R_2$ | $\frac{8}{12}$ | $\frac{8}{16}$ | $\frac{8}{18}$ | $\frac{8}{14}$ | $\frac{8}{14}$ | $\frac{8}{14}$ | $\frac{8}{14}$ | $\frac{8}{14}$ | $\frac{8}{14}$ |
| $R_3$ | $\frac{8}{8}$ | $\frac{8}{8}$ | $\frac{8}{8}$ | $\frac{8}{14}$ | $\frac{8}{14}$ | $\frac{8}{12}$ | $\frac{8}{12}$ | $\frac{8}{12}$ | $\frac{8}{12}$ |
| $R_4$ | $\frac{8}{8}$ | $\frac{8}{8}$ | $\frac{8}{8}$ | $\frac{8}{8}$ | $\frac{8}{8}$ | $\frac{8}{12}$ | $\frac{8}{12}$ | $\frac{8}{12}$ | $\frac{8}{12}$ |
| $VSLR_1$ | 0.009 | 0.032 | 0.027 | 0.030 | 0.007 | 0.016 | 0.004 | 0 | 0 |
| $VSLR_2$ | 1 | 0.350 | 0.027 | 0.206 | 0.063 | 0.016 | 0.004 | 0 | 0 |
| $VSLR_3$ | 1 | 1 | 1 | 0.206 | 0.063 | 0.137 | 0.036 | 0.009 | 0.002 |
| $VSLR_4$ | 1 | 1 | 1 | 1 | 1 | 0.137 | 0.036 | 0.009 | 0.002 |

Because results for the three video sequences (e.g., Bus, Foreman and Coastguard) show the same trends, only the results for the Bus video sequence are described below. For $$\frac{E_s}{N_o} \leq 1 \text{ dB}$$

in Tables IV to VII and FIG. 4(a), the rankings of the different cross-layer FEC schemes based on the minimum $\overline{F}$ are S-IV≥S-II≥S-I≥S-III for channel bit rate C=1.4 Mbps. At low channel SNR, the use of UEP RCPC coding at PHY (e.g., in S-I) achieves much better performance than the use of EEP RCPC coding at PHY and UEP Raptor coding at AL (e.g., in S-III) because: (i) many packets are corrupted in S-III as the EEP FEC codes at PHY cannot protect all of them effectively due to constrained channel bandwidth; (ii) the UEP RCPC code in S-I provides better protection to the higher priority slices and, as a result, more higher priority slices are transmitted error-free in S-I than in S-III; and (iii) the use of Raptor codes at AL (e.g., in S-III) is not helpful when many slices are corrupted at PHY as enough error-free source symbols are not received at AL. A similar behavior is observed in FIG. 4(b) for a relatively lower $$\frac{E_s}{N_o} < -0.5 \text{ dB}$$

at channel bit rate C=1.8 Mbps because more channel bandwidth is available to provide a stronger FEC protection in this case.

TABLE V

OPTIMUM CROSS-LAYER PARAMETERS FOR S-II SCHEME WITH C = 1.4 MBPS

| $\frac{E_s}{N_0}$ | −1 dB | −0.5 dB | 0 dB | 0.5 dB | 1 dB | 1.5 dB | 2 dB | 2.5 dB | 3 dB |
|---|---|---|---|---|---|---|---|---|---|
| $\overline{F}$ | 0.360 | 0.244 | 0.173 | 0.125 | 0.064 | 0.034 | 0 | 0 | 0 |
| $F_{Bus}$ | 160.1 | 108.3 | 77.4 | 55.4 | 29.2 | 14.6 | 0.1 | 0 | 0 |
| $F_{Coastguard}$ | 66.5 | 44.7 | 31.5 | 23.6 | 12.5 | 6.1 | 0 | 0 | 0 |
| $F_{Foreman}$ | 68.6 | 46.0 | 31.6 | 23.9 | 11.6 | 6.6 | 0 | 0 | 0 |
| $R_1$ | $\frac{8}{24}$ | $\frac{8}{20}$ | $\frac{8}{18}$ | $\frac{8}{16}$ | $\frac{8}{16}$ | $\frac{8}{14}$ | $\frac{8}{12}$ | $\frac{8}{12}$ | $\frac{8}{10}$ |
| $R_2$ | $\frac{8}{8}$ | $\frac{8}{16}$ | $\frac{8}{18}$ | $\frac{8}{14}$ | $\frac{8}{14}$ | $\frac{8}{14}$ | $\frac{8}{12}$ | $\frac{8}{12}$ | $\frac{8}{10}$ |
| $R_3$ | $\frac{8}{8}$ | $\frac{8}{8}$ | $\frac{8}{8}$ | $\frac{8}{14}$ | $\frac{8}{14}$ | $\frac{8}{12}$ | $\frac{8}{12}$ | $\frac{8}{12}$ | $\frac{8}{10}$ |
| $R_4$ | $\frac{8}{8}$ | $\frac{8}{8}$ | $\frac{8}{8}$ | $\frac{8}{8}$ | $\frac{8}{8}$ | $\frac{8}{12}$ | $\frac{8}{12}$ | $\frac{8}{12}$ | $\frac{8}{10}$ |
| $\theta_t$ | 1.14 | 1.01 | 1.01 | 1.01 | 1.01 | 1.01 | 1.10 | 1.10 | 1.31 |
| $VSLR_1$ | 0 | 0.032 | 0.027 | 0.030 | 0.006 | 0.016 | 0 | 0 | 0 |
| $VSLR_2$ | 1 | 0.350 | 0.027 | 0.206 | 0.063 | 0.016 | 0 | 0 | 0 |
| $VSLR_3$ | 1 | 1 | 1 | 0.206 | 0.063 | 0.137 | 0 | 0 | 0 |
| $VSLR_4$ | 1 | 1 | 1 | 1 | 1 | 0.137 | 0 | 0 | 0 |

TABLE VI

OPTIMUM CROSS-LAYER PARAMETERS FOR S-III SCHEME WITH C = 1.4 MBPS

| $\frac{E_s}{N_0}$ | −1 dB | −0.5 dB | 0 dB | 0.5 dB | 1 dB | 1.5 dB | 2 dB | 2.5 dB | 3 dB |
|---|---|---|---|---|---|---|---|---|---|
| $\bar{F}$ | 1 | 1 | 0.971 | 0.766 | 0.092 | 0.015 | 0 | 0 | 0 |
| $F_{Bus}$ | 407.9 | 407.7 | 396.1 | 312.4 | 42.0 | 7.0 | 0 | 0 | 0 |
| $F_{Coastguard}$ | 180.1 | 180.0 | 174.9 | 137.9 | 17.3 | 3.0 | 0 | 0 | 0 |
| $F_{Foreman}$ | 214.9 | 214.8 | 208.7 | 164.6 | 16.2 | 2.6 | 0 | 0 | 0 |
| R | $\frac{8}{12}$ | $\frac{8}{12}$ | $\frac{8}{12}$ | $\frac{8}{12}$ | $\frac{8}{12}$ | $\frac{8}{12}$ | $\frac{8}{12}$ | $\frac{8}{12}$ | $\frac{8}{10}$ |
| $\theta_t$ | 1.10 | 1.10 | 1.10 | 1.10 | 1.10 | 1.10 | 1.10 | 1.10 | 1.31 |
| $\rho_1$ | 0.249 | 0.249 | 0.249 | 0.249 | 0.398 | 0.278 | 0.253 | 0.253 | 0.253 |
| $\rho_2$ | 0.249 | 0.249 | 0.249 | 0.249 | 0.394 | 0.273 | 0.250 | 0.250 | 0.252 |
| $\rho_3$ | 0.228 | 0.228 | 0.228 | 0.228 | 0.209 | 0.273 | 0.249 | 0.249 | 0.250 |
| $\rho_4$ | 0.274 | 0.274 | 0.274 | 0.274 | 0 | 0.175 | 0.248 | 0.248 | 0.245 |
| $VSLR_1$ | 1 | 1 | 0.971 | 0.766 | 0.002 | 0.001 | 0 | 0 | 0 |
| $VSLR_2$ | 1 | 1 | 0.971 | 0.766 | 0.006 | 0.004 | 0 | 0 | 0 |
| $VSLR_3$ | 1 | 1 | 0.971 | 0.766 | 0.447 | 0.004 | 0 | 0 | 0 |
| $VSLR_4$ | 1 | 1 | 0.971 | 0.766 | 1 | 0.335 | 0 | 0 | 0 |

TABLE VII

OPTIMUM CROSS-LAYER PARAMETERS FOR S-IV SCHEME WITH C = 1.4 MBPS

| $\frac{E_s}{N_0}$ | −1 dB | −0.5 dB | 0 dB | 0.5 dB | 1 dB | 1.5 dB | 2 dB | 2.5 dB | 3 dB |
|---|---|---|---|---|---|---|---|---|---|
| $\bar{F}$ | 0.150 | 0.150 | 0.116 | 0.040 | 0.039 | 0.015 | 0 | 0 | 0 |
| $F_{Bus}$ | 68.3 | 68.3 | 53.1 | 18.7 | 18.2 | 6.8 | 0 | 0 | 0 |
| $F_{Coastguard}$ | 27.5 | 27.4 | 21.6 | 8.1 | 7.9 | 3.0 | 0 | 0 | 0 |
| $F_{Foreman}$ | 26.6 | 26.6 | 20.5 | 6.8 | 6.6 | 2.5 | 0 | 0 | 0 |
| $R_1$ | $\frac{8}{18}$ | $\frac{8}{16}$ | $\frac{8}{16}$ | $\frac{8}{16}$ | $\frac{8}{14}$ | $\frac{8}{14}$ | $\frac{8}{12}$ | $\frac{8}{12}$ | $\frac{8}{10}$ |
| $R_2$ | $\frac{8}{18}$ | $\frac{8}{16}$ | $\frac{8}{14}$ | $\frac{8}{14}$ | $\frac{8}{14}$ | $\frac{8}{14}$ | $\frac{8}{12}$ | $\frac{8}{12}$ | $\frac{8}{10}$ |
| $R_3$ | $\frac{8}{8}$ | $\frac{8}{12}$ | $\frac{8}{14}$ | $\frac{8}{14}$ | $\frac{8}{12}$ | $\frac{8}{12}$ | $\frac{8}{12}$ | $\frac{8}{12}$ | $\frac{8}{10}$ |
| $R_4$ | $\frac{8}{8}$ | $\frac{8}{8}$ | $\frac{8}{8}$ | $\frac{8}{8}$ | $\frac{8}{12}$ | $\frac{8}{12}$ | $\frac{8}{12}$ | $\frac{8}{12}$ | $\frac{8}{10}$ |
| $\theta_t$ | 1.01 | 1.01 | 1.01 | 1.01 | 1.01 | 1.01 | 1.10 | 1.10 | 1.31 |
| $\rho_1$ | 0.499 | 0.426 | 0.296 | 0.287 | 0.275 | 0.258 | 0.254 | 0.254 | 0.254 |
| $\rho_2$ | 0.500 | 0.422 | 0.539 | 0.357 | 0.273 | 0.255 | 0.252 | 0.252 | 0.252 |
| $\rho_3$ | 0.001 | 0.152 | 0.164 | 0.355 | 0.430 | 0.294 | 0.248 | 0.248 | 0.249 |
| $\rho_4$ | 0 | 0 | 0.001 | 0.001 | 0.022 | 0.193 | 0.246 | 0.246 | 0.245 |
| $VSLR_1$ | 0 | 0 | 0.001 | 0 | 0.001 | 0.001 | 0 | 0 | 0 |
| $VSLR_2$ | 0 | 0 | 0.005 | 0 | 0.002 | 0.002 | 0 | 0 | 0 |
| $VSLR_3$ | 1 | 1 | 0.682 | 0 | 0.002 | 0.007 | 0 | 0 | 0 |
| $VSLR_4$ | 1 | 1 | 1 | 1 | 0.947 | 0.325 | 0.001 | 0 | 0 |

Another interesting observation for $$\frac{E_s}{N_0} \leq 1 \text{ dB}$$

at C=1.4 Mbps is that S-II (which uses UEP RCPC code at PHY and EEP Raptor code at AL) does not perform better than S-I scheme. This is because, for successful decoding of all the Raptor coded symbols, the number of received encoded symbols should be larger than the number of source symbols. For lower channel SNRs, assigning a higher portion of the available channel bandwidth to Raptor codes will not improve the delivered video quality since almost all PHY-frames would be corrupted during transmission. Therefore, the optimization algorithm assigns most of the available coding overhead to RCPC at PHY, while allowing a weaker Raptor code at AL, which decreases PER. As a result, the channel bandwidth available for the EEP Raptor codes at AL is not enough to successfully decode all the source symbols. For channel bit rate C=1.8 Mbps, FIG. 4(b) exhibits the same behavior for $$\frac{E_s}{N_0} \leq 0 \text{ dB}.$$

The S-IV scheme, which uses UEP at both layers, achieves better performance than the other three schemes under all channel conditions. In this scheme, different slices are protected according to their priority at both layers. This scheme therefore benefits both from the ratelessness as well as the UEP property. For $$\frac{Es}{No} \leq 1 \text{ dB}$$

at channel bit rate C=1.4 Mbps, the S-IV schemes achieves much better performance than other schemes because using UEP FEC codes at both layers provide stronger protection to higher priority video slices compared to the lower priority slices. FIG. 4(b) shows similar results for $$\frac{Es}{No} < -0.5 \text{ dB}$$

at channel bit rate C=1.8 Mbps.

For $$\frac{Es}{No} \geq 1.5 \text{ dB}$$

in Tables IV to VII and FIG. 4(a), the rankings of different schemes for achieving the minimum $\overline{F}$ are S-IV≥S-III≥S-II≥S-I. At higher channel SNR, fewer packets are corrupted at PHY and thus the optimization algorithm allocates more channel bandwidth to Raptor codes at AL. As a result, the UEP Raptor codes (in S-III and S-IV) achieve better performance than EEP Raptor codes (in S-II), followed by no FEC at AL (in S-I). Similar behavior is also observed for C=1.8 Mbps in FIG. 4(b) for $$\frac{Es}{No} > 0.5 \text{ dB.}$$

As channel SNR increases further $$\left(e.g., \frac{Es}{No} > 2.5 \text{ dB}\right)$$

for channel bit rate C=1.4 Mbps, the difference of optimum $\overline{F}$ between different schemes is negligible because very few packets are corrupted due to channel error and the EEP FEC codes can provide enough protection. The same performance is achieved for $$\frac{Es}{No} > 1.0 \text{ dB}$$

at channel bit rate C=1.8 Mbps.

FIGS. 4(a) and 4(b) also reveal that FEC at AL is more effective for a channel with C=1.8 Mbps than for C=1.4 Mbps, especially when the channel SNR is low. For example, the S-III outperforms S-I and S-II schemes for $$\frac{Es}{No} > -0.5 \text{ dB}$$

at C=1.8 Mbps, whereas the same result is achieved for $$\frac{Es}{No} > 1.0 \text{ dB}$$

at C=1.4 Mbps. This is because more channel bandwidth is available in the former case that can be assigned to Raptor codes at AL to provide more protection to video data.

Overall, the S-IV scheme achieves the best performance for all three video sequences under different channel SNRs and C. Therefore, the cross-layer UEP (e.g., S-IV scheme) provides best protection for video transmission among the four cross-layer schemes described herein. Note that the optimization is performed only once for a given set of $\overline{CMSE\iota}$ values, a GOP structure, and a set of channel SNRs, and need not to be run separately for each GOP. The same set of optimum parameters can be used for any video stream with the same GOP structure and similar CMSEs.

Performance of Cross-Layer FEC Schemes for Test Videos Over AWGN Channels

Figure 5:
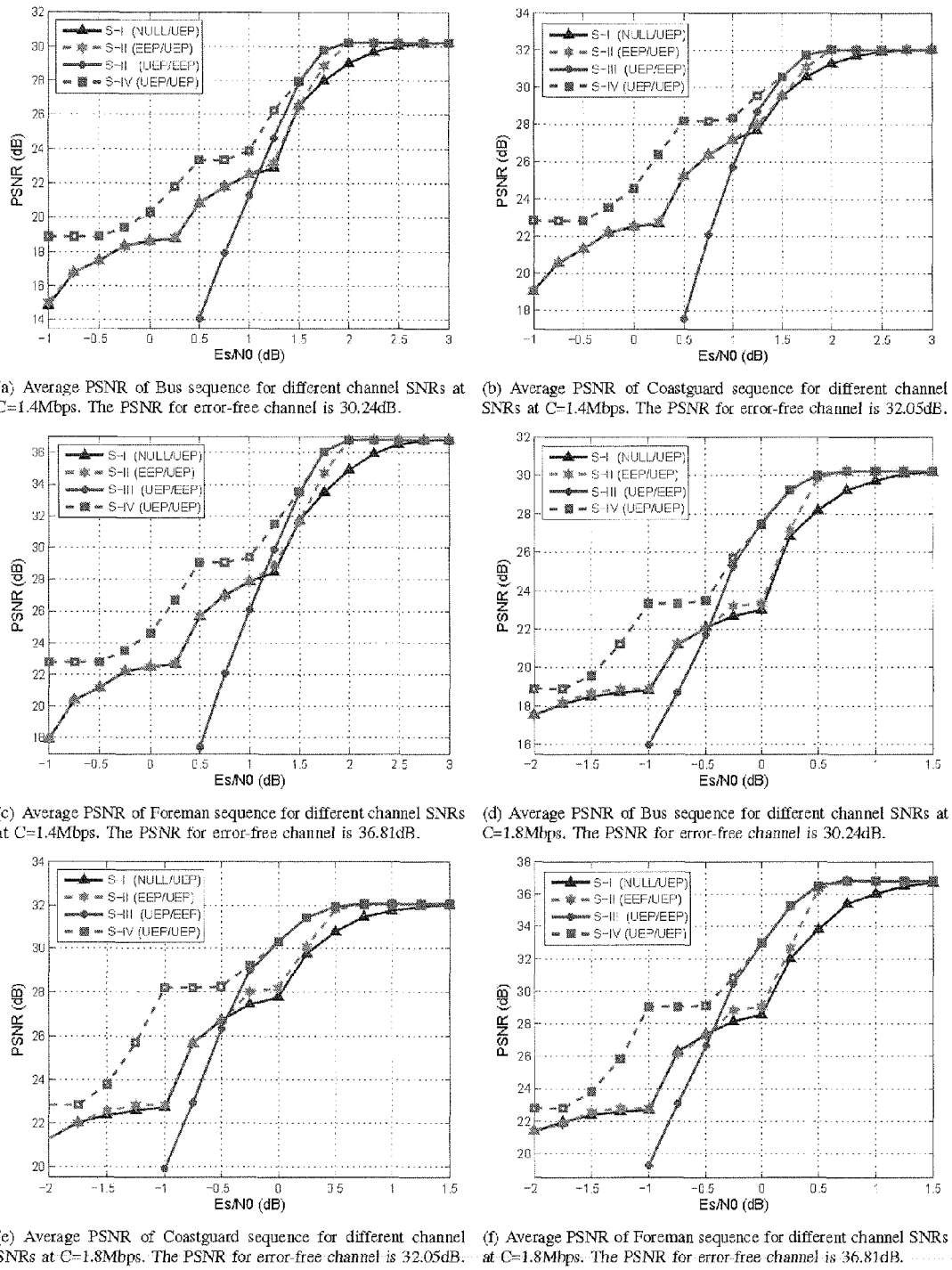
FIG. 5(a)-5(f) are graphs illustrating the average PSNR of various video sequences (i.e., FIGS. 3(a)-3(d)) over an AWGN channel for channel bit rates C=1.4 Mbps or C=1.8 Mbps.

The slice loss rates reported in Tables IV through VII were used to evaluate the average PSNR of three video sequences (e.g., Bus, Foreman, and Coastguard) as shown in FIGS. 5(a)-5(c) for C=1.4 Mbps. Similarly, the slice loss rates were used to evaluate the average PSNR of these same video sequences as shown in FIGS. 5(d)-5(f) for C=1.8 Mbps. From FIGS. 5(a)-5(f), it can be observed that the PSNRs of the test videos are excellent match with the corresponding F and $\overline{F}$ obtained by the numerical optimization described in detail above.

FIGS. 5(d)-5(f) confirm that the cross-layer FEC S-IV scheme, with UEP coding at AL and PHY, achieves considerable improvement in average video PSNR over the remaining three schemes. It outperforms S-I and S-II schemes by about 1.5~4 dB for $$\frac{Es}{No} \leq 1.5 \text{ dB,}$$

and S-III scheme by more than 3 dB for $$\frac{Es}{No} \leq 1 \text{ dB}$$

(at C=1.4 Mbps). At C=1.8 Mbps, S-IV outperforms the S-I and S-II schemes by about 1~4 dB for $$\frac{Es}{No} \leq 0.25 \text{ dB,}$$

and the S-III scheme by about 2~7 dB for $$\frac{Es}{No} \leq -0.5 \text{ dB.}$$

Although the cross-layer FEC parameters were optimized for the Bus video sequence, the average PSNR performance of the Bus video sequence is similar for the other two test video sequences, e.g., Foreman and Coastguard. As mentioned earlier, both these video sequences have different characteristics than the Bus video sequence. Thus, it is possible to conclude that the resulting optimum parameters are robust with respect to CMSE.

Figure 6:
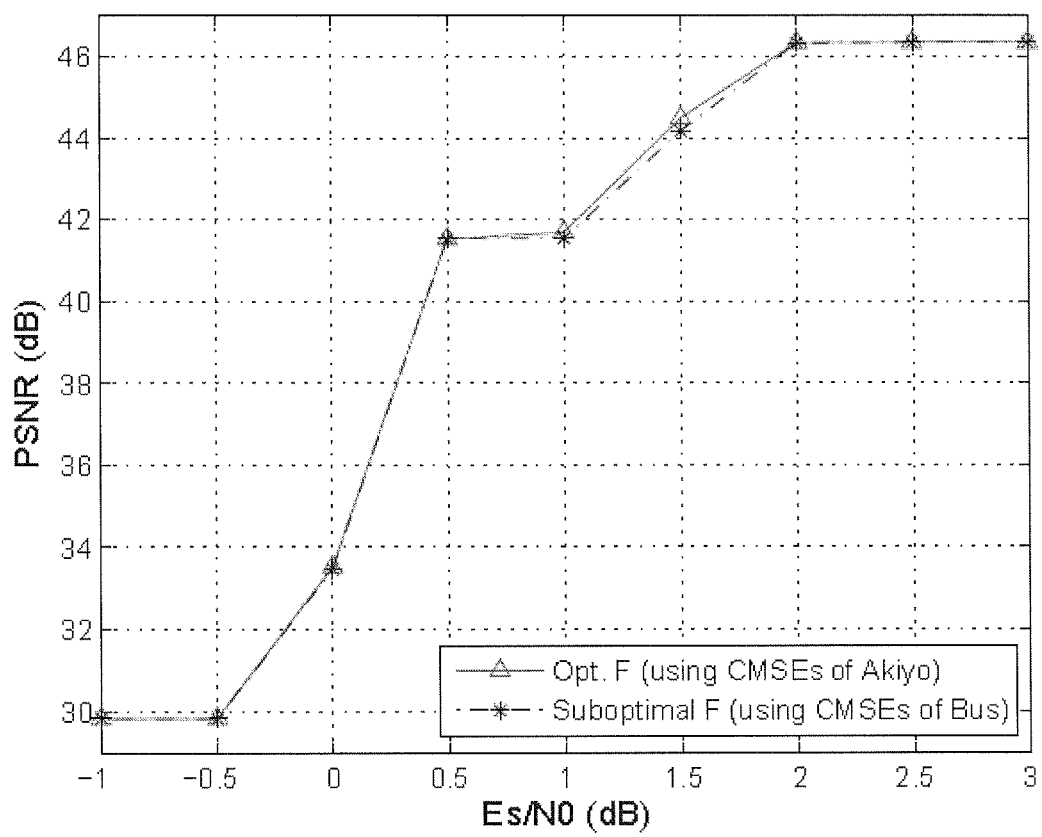
FIG. 6 is a graph illustrating the average PSNR of optimal and sub-optimal cross-layer FEC scheme S-IV for the Akiyo video sequence (i.e., FIG. 3(d)) over an AWGN channel.

Since the Akiyo video sequence has considerably different values of $\overline{CMSE_i}$, the S-IV scheme designed by using the Bus video sequence's $\overline{CMSE_i}$ values may be suboptimal for the Akiyo video sequence. In order to study the effect of these CMSE variations, the S-IV scheme was designed by using the $\overline{CMSE_i}$ values of the Akiyo video sequence and comparing its performance with its suboptimal version. The optimization results are shown in Table VIII for C=1.4 Mbps. In Table VIII, the suboptimal values of $F_{sub}$ and $PSNR_{sub}$, which were obtained by using the optimized parameters of the Bus video sequence from Table VII, are also included. The values of $PSNR_{opt}$ and $PSNR_{sub}$ are also shown in FIG. 6.

to conclude that the performance of the proposed cross-layer FEC scheme is not very sensitive to the precise values of normalized CMSE.

Performance of Cross-Layer FEC Schemes for Test Videos Over Fading Channels

The performance of cross-layer FEC schemes over a Rayleigh flat fading channel with additive white Gaussian noise was also evaluated as described below. It is assumed that the channel is time-invariant over the duration of one packet and use the instantaneous SNR to characterize the CSI. We use Y[i] to denote the instantaneous SNR of ith packet. For a Rayleigh flat fading channel, the SNR follows an exponential distribution and can be described by the average SNR. Specifically, $$Pr(SNR < x) = 1 - e^{-\frac{1}{\lambda}x}$$

when the average SNR is $\lambda$. The past SNR observations can be used from previous transmissions to estimate and update the fading distribution.

TABLE VIII

OPTIMAL CROSS-LAYER PARAMETERS FOR S-IV AT C = 1.4 MBPS FOR AKIYO VIDEO SEQUENCE

| $\frac{E_s}{N_0}$ | −1 dB | −0.5 dB | 0 dB | 0.5 dB | 1 dB | 1.5 dB | 2 dB | 2.5 dB | 3 dB |
|---|---|---|---|---|---|---|---|---|---|
| $F_{opt}$ | 1.052 | 1.051 | 0.802 | 0.194 | 0.192 | 0.077 | 0.001 | 0 | 0 |
| $F_{sub}$ | 1.052 | 1.051 | 0.808 | 0.194 | 0.205 | 0.096 | 0.001 | 0 | 0 |
| $PSNR_{opt}$ | 29.83 | 29.83 | 33.53 | 41.53 | 41.69 | 44.49 | 46.34 | 46.35 | 46.35 |
| $PSNR_{sub}$ | 29.83 | 29.83 | 33.47 | 41.53 | 41.54 | 44.17 | 46.33 | 46.35 | 46.35 |
| $R_1$ | $\frac{8}{18}$ | $\frac{8}{16}$ | $\frac{8}{16}$ | $\frac{8}{16}$ | $\frac{8}{14}$ | $\frac{8}{14}$ | $\frac{8}{12}$ | $\frac{8}{12}$ | $\frac{8}{10}$ |
| $R_2$ | $\frac{8}{18}$ | $\frac{8}{16}$ | $\frac{8}{14}$ | $\frac{8}{14}$ | $\frac{8}{14}$ | $\frac{8}{14}$ | $\frac{8}{12}$ | $\frac{8}{12}$ | $\frac{8}{10}$ |
| $R_3$ | $\frac{8}{8}$ | $\frac{8}{12}$ | $\frac{8}{14}$ | $\frac{8}{14}$ | $\frac{8}{12}$ | $\frac{8}{12}$ | $\frac{8}{12}$ | $\frac{8}{12}$ | $\frac{8}{10}$ |
| $R_4$ | $\frac{8}{8}$ | $\frac{8}{8}$ | $\frac{8}{8}$ | $\frac{8}{8}$ | $\frac{8}{12}$ | $\frac{8}{12}$ | $\frac{8}{12}$ | $\frac{8}{12}$ | $\frac{8}{10}$ |
| $\theta_t$ | 1.01 | 1.01 | 1.01 | 1.01 | 1.01 | 1.01 | 1.10 | 1.10 | 1.31 |
| $\rho_1$ | 0.499 | 0.435 | 0.299 | 0.293 | 0.281 | 0.264 | 0.257 | 0.257 | 0.254 |
| $\rho_2$ | 0.500 | 0.428 | 0.544 | 0.358 | 0.274 | 0.259 | 0.250 | 0.250 | 0.253 |
| $\rho_3$ | 0.001 | 0.137 | 0.157 | 0.349 | 0.430 | 0.294 | 0.248 | 0.248 | 0.249 |
| $\rho_4$ | 0 | 0 | 0 | 0 | 0.015 | 0.183 | 0.245 | 0.245 | 0.244 |
| $VSLR_1$ | 0 | 0 | 0 | 0 | 0 | 0 | 0 | 0 | 0 |
| $VSLR_2$ | 0 | 0 | 0.003 | 0 | 0.001 | 0 | 0 | 0 | 0 |
| $VSLR_3$ | 1 | 1 | 0.693 | 0 | 0.002 | 0.007 | 0 | 0 | 0 |
| $VSLR_4$ | 1 | 1 | 1 | 1 | 0.965 | 0.360 | 0.001 | 0 | 0 |

In Table VIII (for optimal scheme) and Table VII (for suboptimal scheme), the Raptor code overhead ($\theta_t$) and RCPC code strength (R) are the same for both schemes, whereas the values of Raptor code protection level $\rho_i$ for each priority level vary slightly (e.g., $\rho_1$ is higher for optimal scheme compared to the suboptimal scheme). Similarly, the values of $VSLR_i$ for higher priority slices (which have the most impact on F and PSNR) are similar in both tables. The maximum PSNR degradation of the suboptimal scheme compared to the optimal scheme is 0.32 dB at the channel SNR of 1.5 dB, with only about 0.01 to 0.15 dB PSNR degradation at other channel SNRs. It is, therefore, possible In many video streaming applications, Raptor codes are applied on a block of packets of a few video frames or one whole GOP. On the other hand, FEC at the PHY layer is applied at a per packet basis using the instantaneous channel SNR. The cross-layer scheme thus uses two different time scales. It uses the average channel SNR to apply a cross-layer optimization at a longer timescale (e.g., a two video frame time or one GOP time), and does not assume non-causal channel knowledge. The optimization process for the four FEC schemes is the same as described in detail above. From the cross-layer optimization, the FEC overhead for protecting video data of each priority level at AL and a PER constraint, which should be achieved at PHY layer by the RCPC code, can be obtained. Then Raptor codes use the optimal allocated overhead for each priority level video data to encode the source symbols. For each packet at PHY layer, a suitable RCPC code rate is selected according to the instantaneous SNR and the PER constraint of each priority packet.

Figure 7:
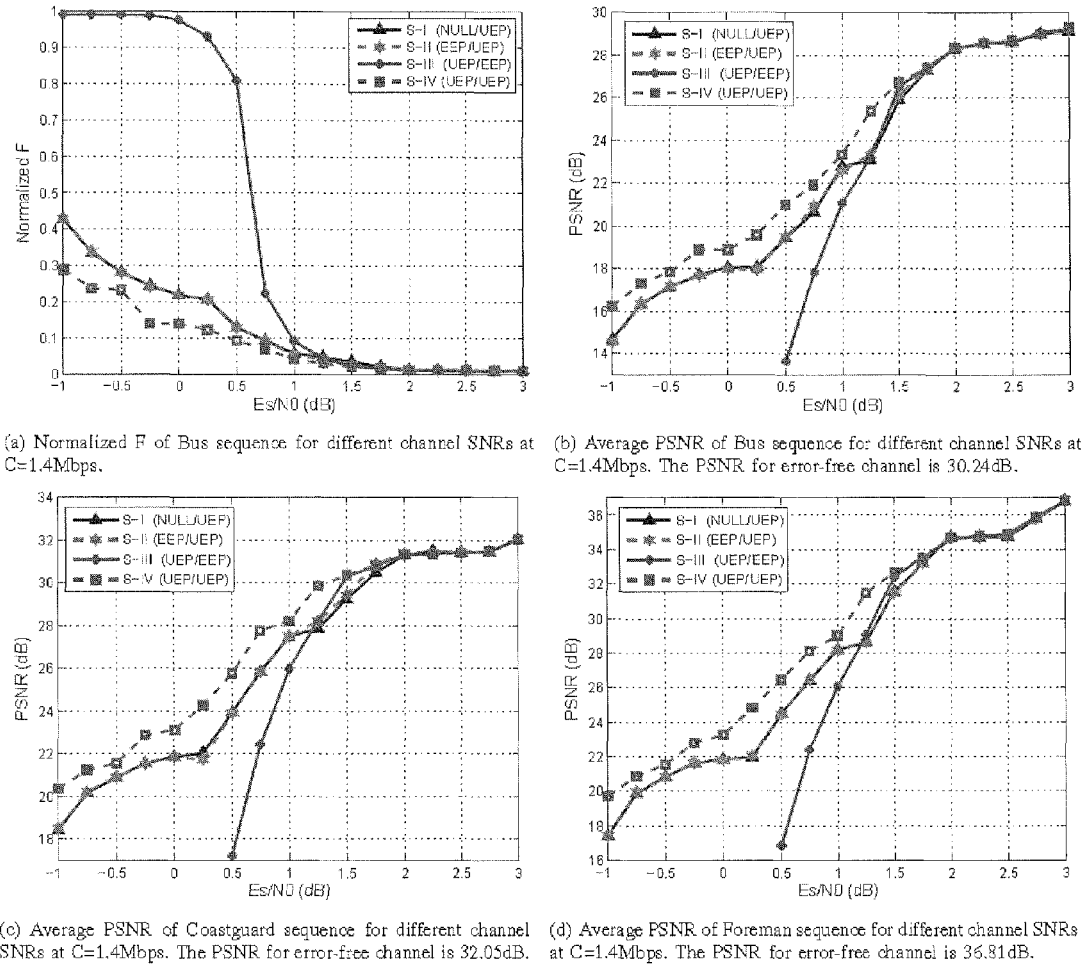
FIGS. 7(a)-7(d) are graphs illustrating the normalized optimization function (i.e., ¯) and the average PSNR of various video sequences (i.e., FIGS. 3(a)-3(d)) over a Rayleigh flat fading channel for a channel bit rate of C=1.4 Mbps where optimization is performed for each group of pictures (GOP) at a time.
Figure 8:
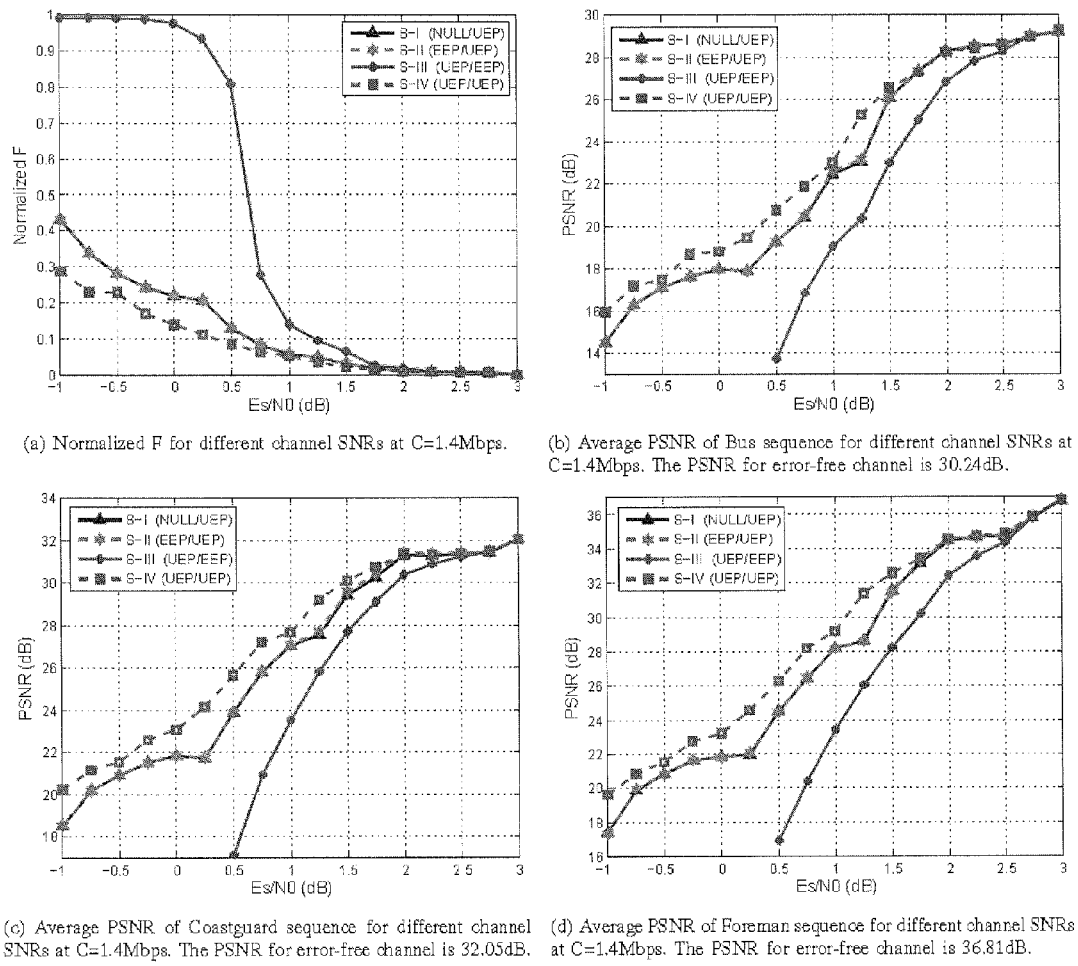
FIG. 8(a)-8(d) are graphs illustrating the normalized optimization function (i.e., ¯) and the average PSNR of various sequences (i.e., FIGS. 3(a)-3(d)) over a Rayleigh flat fading channel for a channel bit rate of C=1.4 Mbps where optimization is performed every two video frames.

The experimental results for the cross-layer FEC schemes using one GOP and two frames for optimization in Rayleigh flat fading channel are shown in FIGS. 7 and 8, respectively. The cross-layer FEC S-IV scheme, with UEP coding at AL and PHY, achieves a PSNR gain of about 0.5~3 dB, compared to the S-I and S-II schemes, for $$\frac{Es}{No} \leq 1.5 \text{ dB}.$$

S-IV scheme outperforms S-III scheme by more than 2.5 dB for $$\frac{Es}{No} \leq 1 \text{ dB}.$$

The PSNR achieved by the cross-layer FEC schemes using two frames for optimization is only slightly lower than for the respective FEC schemes that use one GOP for optimization, except the S-III scheme, which suffers more PSNR loss, as described below.

The PSNR achieved by the S-III scheme when two frames are used for optimization is lower than the scheme which uses one-GOP for optimization because the number of slices available for Raptor encoder is proportional to the number of the frame used in optimization. From Eqn. (3), it is known that the efficiency of the Raptor code decreases when the number of source symbols in a block decreases. Among the remaining three cross-layer FEC schemes, S-I does not use the Raptor code whereas the use of UEP at PHY in S-II and S-IV largely compensates for the loss in Raptor code efficiency by protecting the higher priority packets.

The PSNR gain achieved by the S-IV scheme is lower for Rayleigh flat fading channel than for AWGN channel because each packet in the fading channel model can experience different channel conditions. As a result, the cross-layer optimization at the AL, which uses average SNR for a block of packets, is not accurate and the RCPC code rate may become sub-optimal. When the channel SNR becomes lower than the average, a lower RCPC code rate is allocated to satisfy the PER constraints for higher priority packets. As a result, the lower priority packets are not sufficiently protected and would experience higher PER, resulting in lower video PSNR.

Figure 9:
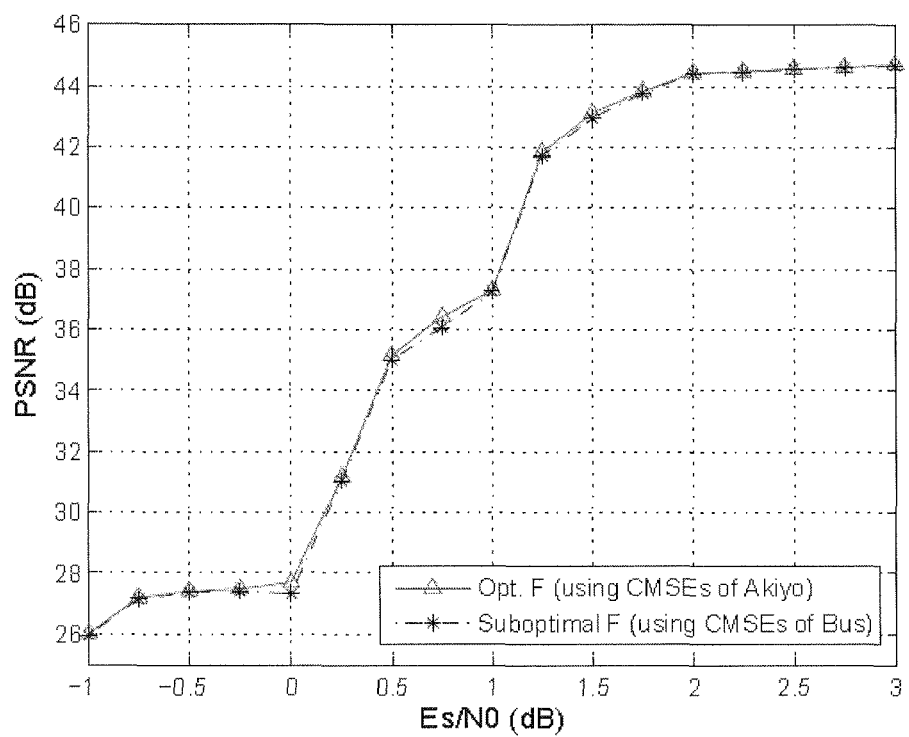
FIG. 9 is a graph illustrating the average PSNR of optimal and sub-optimal cross-layer FEC scheme S-IV for the Akiyo video sequence (i.e., FIG. 3(d)) over a Rayleigh flat fading channel.

Since the Akiyo video sequence has considerably different values of $\overline{CMSEi}$, the S-IV scheme designed by using the Bus video sequence's $\overline{CMSEi}$ values may be suboptimal for the Akiyo video sequence. In order to study the effect of these CMSE variations in fading channel, the S-IV scheme was designed by using the $\overline{CMSEi}$ values of the Akiyo video sequence and comparing its performance with its suboptimal version. The values of $PSNR_{opt}$ and $PSNR_{sub}$, which were obtained by using the optimized parameters of Akiyo and Bus video sequences, are shown in FIG. 9. The maximum PSNR degradation of the suboptimal scheme compared to the optimal scheme is 0.35 dB at the channel SNRs of 0 dB and 0.75 dB, with only about 0.01 to 0.15 dB PSNR degradation at other channel SNRs. It is, therefore, possible to conclude that the performance of the proposed cross-layer FEC scheme is not very sensitive to the precise values of normalized CMSE in fading channel, which is similar to the observation for the AWGN channels.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A cross-layer encoder for providing unequal error protection (UEP) encoding of video data, comprising:
   at least one processor; and
   a memory operably coupled to the processor, the memory having computer-executable instructions stored thereon for providing UEP encoding of the video data at an application layer of a transmission channel that, when executed by the processor, cause the processor to:
   receive, at the application layer, one or more video packets having a first priority level and one or more video packets having a second priority level,
   apply a first coding scheme to the video packets having the first priority level and a second coding scheme to the video packets having the second priority level, and
   pass encoded video frames having the first priority level and encoded video frames having the second priority level to a lower layer, wherein the first and second coding schemes generate different respective percentages of a total coding overhead based on the first and second priority levels and a probability selection model defined in accordance with a symbol recovery rate being above a predetermined threshold, and
   wherein the different percentages of the total coding overhead generated by the first and second coding schemes, respectively, and
   wherein the memory has further computer-executable instructions stored thereon for providing UEP encoding of the video data at a physical layer of the transmission channel that, when executed by the processor, cause the processor to:
   receive, at the physical layer, one or more of the encoded video frames having the first priority level and one or more of the encoded video frames having the second priority level,
   apply a third coding scheme to the encoded video frames having the first priority level and a fourth coding scheme to the encoded video frames having the second priority level, and
   transmit the cross-layer encoded video frames having the first priority level and the cross-layer encoded video frames having the second priority level, wherein the third and fourth coding schemes generate different percentages of the total coding overhead based on the first and second priority levels, respectively.

2. The cross-layer encoder of claim 1, wherein a greater percentage of the total coding overhead is generated by the first or second coding scheme applied to the video packets having a higher priority level.

3. The cross-layer encoder of claim 2, wherein the greater percentage of the total coding overhead is selected such that a recovery rate of the video packets having the higher priority level exceeds a predefined threshold.

4. The cross-layer encoder of claim 1, wherein the memory has further computer-executable instructions stored thereon that, when executed by the processor, cause the processor to adaptively adjust the different percentages of the total coding overhead generated by the first and second coding schemes, respectively, based on a video packet error rate.

5. The cross-layer encoder of claim 1, wherein each of the first and second coding schemes is a systematic Raptor code.

6. The cross-layer encoder of claim 1, wherein each of the third and fourth coding schemes is a rate-compatible punctured convolutional (RCPC) code.

7. The cross-layer encoder of claim 6, wherein a lower RCPC code rate is assigned to the third or fourth coding scheme applied to encoded video frames having a higher priority level.

8. The cross-layer encoder of claim 6, wherein an RCPC code rate respectively assigned to each of the third and fourth coding schemes applied to the encoded video frames having the first and second priority levels, respectively, is selected from RCPC codes $$\left\{\frac{8}{8}, \frac{8}{9}, \frac{8}{10}, \frac{8}{12}, \frac{8}{14}, \frac{8}{16}, \frac{8}{18}, \frac{8}{20}, \frac{8}{22}, \frac{8}{24}\right\}.$$

9. The cross-layer encoder of claim 1, wherein the memory has further computer-executable instructions stored thereon that, when executed by the processor, cause the processor to determine optimal parameters for each of the first, second, third and fourth coding schemes based on one or more characteristics of the transmission channel.

10. The cross-layer encoder of claim 9, wherein the characteristics of the transmission channel include at least one of a signal-to-noise ratio or a bandwidth of the transmission channel.

11. The cross-layer encoder of claim 9, wherein the optimal parameters for the first, second, third and fourth coding schemes are determined using a genetic algorithm.

12. The cross-layer encoder of claim 9, wherein each of the first and second coding schemes is a systematic Raptor code, and the optimal parameters comprise values for a probability selection model used to determine the different percentages of the total coding overhead generated by the first and second coding schemes, respectively.

13. The cross-layer encoder of claim 9, wherein each of the third and fourth coding schemes is an RCPC code, and the optimal parameters comprise RCPC code rates selected to determine the different percentages of the total coding overhead generated by the third and fourth coding schemes, respectively.

14. A method for providing unequal error protection (UEP) encoding of video data at an application layer of a transmission channel and UEP encoding of the video data at a physical layer of the transmission channel, comprising:
  receiving, at the application layer, one or more video packets, each of the video packets having a priority level;
  applying a first coding scheme to the video packets having a first priority level;
  applying a second coding scheme to the video packets having a second priority level wherein the first and second coding schemes generate different respective percentages of the total coding overhead based on the first and second priority levels and a probability selection model defined in accordance with a symbol recovery rate being above a predetermined threshold;
  passing encoded video frames having the first priority level and encoded video frames having the second priority level to a lower layer;
  receiving, at the physical layer, one or more of the encoded video frames having the first priority level and one or more of the encoded video frames having the second priority level;
  applying a third coding scheme to the encoded video frames having the first priority level;
  applying a fourth coding scheme to the encoded video frames having the second priority level, wherein the third and fourth coding schemes generate different percentages of the total coding overhead based on the first and second priority levels, respectively; and
  transmitting the cross-layer encoded video frames having the first priority level and the cross-layer encoded video frames having the second priority level.

15. The method of claim 14, wherein a greater percentage of the total coding overhead is generated by the first or second coding scheme applied to the video packets having a higher priority level.

16. The method of claim 15, wherein the greater percentage of the total coding overhead is selected such that a recovery rate of the video packets having the higher priority level exceeds a predefined threshold.

17. The method of claim 14, further comprising adaptively adjusting the different percentages of the total coding overhead generated by the first and second coding schemes, respectively, based on a video packet error rate.

18. The method of claim 14, wherein each of the first and second coding schemes is a systematic Raptor code.

19. The method of claim 14, wherein each of the third and fourth coding schemes is a rate-compatible punctured convolutional (RCPC) code.

20. The method of claim 19, wherein a lower RCPC code rate is assigned to the third or fourth coding scheme applied to encoded video frames having a higher priority level.

21. The method of claim 19, wherein an RCPC code rate respectively assigned to each of the third and fourth coding schemes applied to the encoded video frames having the first and second priority levels, respectively, is selected from RCPC codes $$\left\{\frac{8}{8}, \frac{8}{9}, \frac{8}{10}, \frac{8}{12}, \frac{8}{14}, \frac{8}{16}, \frac{8}{18}, \frac{8}{20}, \frac{8}{22}, \frac{8}{24}\right\}.$$

22. The method of claim 14, further comprising determining optimal parameters for each of the first, second, third, and fourth coding schemes based on one or more characteristics of the transmission channel.

23. The method of claim 22, wherein the characteristics of the transmission channel include at least one of a signal-to-noise ratio or a bandwidth of the transmission channel.

24. The method of claim 22, wherein the optimal parameters for the first, second, third, and fourth coding schemes are determined using a genetic algorithm.

25. The method of claim 22, wherein each of the first and second coding schemes is a systematic Raptor code, and the optimal parameters comprise values for a probability selection model used to determine the different percentages of the total coding overhead generated by the first and second coding schemes, respectively.

26. The method of claim 22, wherein each of the third and fourth coding schemes is an RCPC code, and the optimal parameters comprise RCPC code rates selected to determine the different percentages of the total coding overhead generated by the third and fourth coding schemes, respectively.

* * * * *